(12) United States Patent
Scotto et al.

(10) Patent No.: US 9,178,235 B2
(45) Date of Patent: Nov. 3, 2015

(54) REDUCING GAS GENERATORS AND METHODS FOR GENERATING A REDUCING GAS

(75) Inventors: Mark Vincent Scotto, Uniontown, OH (US); Mark Anthony Perna, Alliance, OH (US)

(73) Assignee: LG Fuel Cell Systems, Inc., North Canton, OH (US)

( * ) Notice: Subject to any disclaimer, the term of this patent is extended or adjusted under 35 U.S.C. 154(b) by 775 days.

(21) Appl. No.: 13/174,044

(22) Filed: Jun. 30, 2011

(65) Prior Publication Data

US 2012/0012782 A1 Jan. 19, 2012

Related U.S. Application Data

(63) Continuation-in-part of application No. 12/554,460, filed on Sep. 4, 2009, now Pat. No. 8,668,752, and a continuation-in-part of application No. 12/554,039, filed on Sep. 4, 2009, now Pat. No. 8,597,841.

(51) Int. Cl.
*B01J 7/00* (2006.01)
*H01M 8/06* (2006.01)
*H01M 8/04* (2006.01)
(Continued)

(52) U.S. Cl.
CPC .............. *H01M 8/0618* (2013.01); *C01B 3/38* (2013.01); *C01B 3/382* (2013.01); *C01B 3/386* (2013.01); *H01M 8/04268* (2013.01); *H01M 8/04328* (2013.01); *H01M 8/04425* (2013.01); *H01M 8/04731* (2013.01); *H01M 8/04776* (2013.01); *H01M 8/04798* (2013.01); *C01B 2203/0261* (2013.01); *C01B 2203/066* (2013.01); *C01B 2203/142* (2013.01); *C01B 2203/1604* (2013.01); *H01M 2008/1293* (2013.01); *Y02E 60/50* (2013.01); *Y02E 60/525* (2013.01)

(58) Field of Classification Search
CPC .............. C01B 2203/1276; C01B 2203/1685; C01B 2203/169; C01B 2203/1676; C01B 3/36
See application file for complete search history.

(56) References Cited

U.S. PATENT DOCUMENTS 4,003,345 A 1/1977 Bradley
4,108,114 A 8/1978 Kosaka et al.
(Continued)

FOREIGN PATENT DOCUMENTS

CN 101597029 A 12/2009
DE 202004020318 U1 3/2005
(Continued)

OTHER PUBLICATIONS

Birmingham et al, Development of an External Fuel Processor for a Solid Oxide Fuel Cell. Department of Energy/Office of Science and Techincal Information, Technical Report (Jun. 5, 2008) DOI:10.2172/043976, entire document.
International Search Report and Written Opinion, PCT/US2010/047850, Sep. 3, 2010, Rolls-Royce Fuel Cell Systems (US) Inc.
International Search Report and Written Opinion, PCT/US2010/047831, Sep. 3, 2010, Rolls-Royce Fuel Cell Systems (US) Inc.
Farrauto, et al., Fundamentals of Industrial Catalytic Processes, pp. 632-634.
(Continued)

*Primary Examiner* — Imran Akram
(74) *Attorney, Agent, or Firm* — Krieg DeVault LLP

(57) ABSTRACT

One embodiment of the present invention is a unique reducing gas generator. Another embodiment is a unique method for generating a reducing gas. Other embodiments include apparatuses, systems, devices, hardware, methods, and combinations for generating reducing gas. Further embodiments, forms, features, aspects, benefits, and advantages of the present application will become apparent from the description and figures provided herewith.

13 Claims, 10 Drawing Sheets

(51) Int. Cl.
*C01B 3/38* (2006.01)
*H01M 8/12* (2006.01)

(56) References Cited

U.S. PATENT DOCUMENTS

| | | | |
|---|---|---|---|
| 4,522,894 A | 6/1985 | Hwang et al. | |
| 4,567,857 A | 2/1986 | Houseman et al. | |
| 4,676,805 A | 6/1987 | Richter | |
| 5,041,195 A | 8/1991 | Taylor et al. | |
| 5,133,842 A | 7/1992 | Taylor et al. | |
| 5,175,061 A | 12/1992 | Hildebrandt et al. | |
| 5,248,567 A | 9/1993 | Amemiya et al. | |
| 5,364,476 A | 11/1994 | Poor | |
| 5,397,790 A | 3/1995 | Butera | |
| 5,457,963 A | 10/1995 | Cahill-O'Brien et al. | |
| 5,678,526 A | 10/1997 | Cullen | |
| 5,680,764 A | 10/1997 | Viteri | |
| 5,928,805 A | 7/1999 | Singh et al. | |
| 5,938,800 A | 8/1999 | Verrill et al. | |
| 6,077,490 A | 6/2000 | McIlroy et al. | |
| 6,326,095 B1 | 12/2001 | Kneidel | |
| 6,397,790 B1 | 6/2002 | Collier, Jr. | |
| 6,455,008 B1* | 9/2002 | Aoyama et al. | 422/108 |
| 6,562,496 B2 | 5/2003 | Faville et al. | |
| 6,588,379 B2 | 7/2003 | Bingham et al. | |
| 6,612,830 B2 | 9/2003 | Berry et al. | |
| 6,645,650 B2 | 11/2003 | Meyer et al. | |
| 6,680,136 B2 | 1/2004 | Mieney et al. | |
| 6,739,289 B2 | 5/2004 | Hiltner et al. | |
| 6,742,507 B2 | 6/2004 | Keefer et al. | |
| 6,767,376 B1 | 7/2004 | Perna et al. | |
| 6,811,907 B1 | 11/2004 | Wang | |
| 6,851,398 B2 | 2/2005 | Taylor, III et al. | |
| 6,976,353 B2 | 12/2005 | Daniel et al. | |
| 7,008,725 B2 | 3/2006 | Kajiura et al. | |
| 7,201,127 B2 | 4/2007 | Rockewell | |
| 7,467,621 B2 | 12/2008 | Lauper, Jr. et al. | |
| 7,497,882 B2 | 3/2009 | Ahmed | |
| 7,584,739 B2 | 9/2009 | Takahashi et al. | |
| 7,687,162 B2 | 3/2010 | Sanagi et al. | |
| 7,703,445 B2 | 4/2010 | Haga | |
| 7,883,555 B2 | 2/2011 | Penman | |
| 8,623,106 B2 | 1/2014 | Oshihara et al. | |
| 8,668,752 B2* | 3/2014 | Scotto et al. | 48/127.9 |
| 2002/0031454 A1 | 3/2002 | Oe | |
| 2002/0031690 A1 | 3/2002 | Shimazu et al. | |
| 2002/0062943 A1* | 5/2002 | Kondo et al. | 165/4 |
| 2002/0098400 A1 | 7/2002 | Mieney et al. | |
| 2002/0102443 A1 | 8/2002 | Yang | |
| 2002/0131907 A1* | 9/2002 | Iwasaki | 422/110 |
| 2004/0058241 A1 | 3/2004 | Kajiura et al. | |
| 2004/0099226 A1 | 5/2004 | Bromberg et al. | |
| 2004/0115488 A1 | 6/2004 | Sanagi | |
| 2004/0118046 A1 | 6/2004 | Williamson et al. | |
| 2004/0126644 A1 | 7/2004 | Brett | |
| 2004/0180250 A1 | 9/2004 | Nanaumi et al. | |
| 2005/0191535 A1 | 9/2005 | Penev | |
| 2006/0000142 A1* | 1/2006 | Cui et al. | 48/127.9 |
| 2006/0019139 A1 | 1/2006 | Matsui et al. | |
| 2006/0029540 A1 | 2/2006 | Perna et al. | |
| 2006/0037308 A1 | 2/2006 | Kamijo et al. | |
| 2007/0065711 A1* | 3/2007 | Gopal | 429/38 |
| 2007/0082238 A1 | 4/2007 | Lee et al. | |
| 2007/0151540 A1 | 7/2007 | Takahashi | |
| 2007/0180769 A1* | 8/2007 | Bonadies et al. | 48/198.7 |
| 2007/0269691 A1 | 11/2007 | Ko | |
| 2008/0020333 A1* | 1/2008 | Smaling et al. | 431/2 |
| 2008/0057359 A1 | 3/2008 | Venkataraman | |
| 2008/0102328 A1 | 5/2008 | Saunders | |
| 2008/0118798 A1 | 5/2008 | Gallagher | |
| 2008/0141984 A1 | 6/2008 | Haga | |
| 2008/0160363 A1 | 7/2008 | Tsukada | |
| 2008/0199376 A1 | 8/2008 | Limaye | |
| 2008/0226955 A1 | 9/2008 | Scotto | |
| 2009/0011298 A1 | 1/2009 | Sato et al. | |
| 2009/0148730 A1 | 6/2009 | Chizawa et al. | |
| 2009/0252653 A1 | 10/2009 | Oshihara et al. | |
| 2010/0200812 A1* | 8/2010 | Yamada et al. | 252/376 |
| 2010/0316532 A1* | 12/2010 | Motohashi et al. | 422/105 |
| 2011/0003214 A1 | 1/2011 | Foley et al. | |
| 2011/0005505 A1 | 1/2011 | Ulrey | |
| 2011/0016791 A1* | 1/2011 | Roychoudhury et al. | 48/62 R |
| 2011/0059377 A1 | 3/2011 | Scotto | |
| 2012/0012782 A1 | 1/2012 | Scotto | |
| 2012/0012783 A1 | 1/2012 | Sotto | |

FOREIGN PATENT DOCUMENTS

| | | |
|---|---|---|
| EP | 0 018 693 B1 | 11/1980 |
| EP | 1852930 A1 | 11/2007 |
| EP | 2101371 A2 | 9/2009 |
| WO | WO 02/42628 A2 | 5/2002 |
| WO | WO 2008/091801 A2 | 7/2008 |
| WO | WO 2008/095076 A1 | 8/2008 |
| WO | 2011060530 A1 | 5/2011 |

OTHER PUBLICATIONS

Tsolakis, et al., Combustion Characteristics and Exhaust Gas Emissions of a Diesel Engine Supplied with Reformed EGR, SAE International 2005-01-2087, 2005.
Clark, et al., Effect of Fuel Compositon on the Opertion of a Lean-Burn Natural Gas Engine, West Virginia University, pp. 1-17, Document 952560.
Driscoll, et al, LNG Interchangeability/Gas Quality: Results of the National Energy Technology Laboratory's Research for the FERC on Natural Gas Quality and Intechangeabilty DOE/NETL-2007/1290, Jun. 2007.
Krishnan, et al., Strategies for Reduced NOx Emissions in Pilot-Ignited Natural Gas Engines, Journal of Engineering for Gas Turbines and Power, Jul. 2004, vol. 126, pp. 665-671.
Smith, et al., Stoichiometric Operation of a Gas Engine Utilizing Synthesis Gas and EGR for NOx Control, Journal of Engineering for Gas Turbines and Power, Oct. 2000, vol. 122, pp. 617-623.
Smutzer, Application of Hydrogen Assisted Lean Operation to Natural Gas-Fueled Reciprocating Engines (HALO), TIAX LLC, Jan. 2006.
International Search Report and Written Opinion, PCT/US2012/044191, Sep. 20, 2012, Rolls-Royce Fuel Cell Systems (US) Inc.
International Search Report and Written Opinion, PCT/US2012/044226, Sep. 13, 2012, Rolls-Royce Fuel Cell Systems (US) Inc.
International Search Report and Written Opinion, PCT/US2012/044210, Sep. 14, 2012, Rolls-Royce Fuel Cell Systems (US) Inc.
International Search Report and Written Opinion, PCT/US2012/044193, Sep. 13, 2012, Rolls-Royce Fuel Cell Systems (US) Inc.
Hu, et al., Advanced NOx Aftertreatment System and Controls for On-Highway Heavy Duty Diesel Engines, SAE Technical Paper Series 2006-01-3552, Oct. 31-Nov. 2, 2006.
Hydrogen MSDS, Manual [online]. Air Products 2012 [retrieved on Aug. 29, 2012] Retrieved from the Internet: <URL: https://apdirect.airproducts.com/msds/DisplayPDF.aspx?docid=63578> entire document.
International Search Report and the Written Opinion of the International Searching Authority, PCT/US2010/047831, Dec. 29, 2010, Rolls Royce Fuel Cell Systems (US) Inc.
International Search Report and the Written Opinion of the International Searching Authority, PCT/US2010/047850, Oct. 25, 2010, Rolls Royce Fuel Cell Systems (US) Inc.
Supplemental European Search Report, EP 10 81 4572.3, Rolls-Royce Fuel Cell Systems Inc., Dec. 6, 2013.
Extended European Search Report, Jul. 29, 2015, European Patent Application No. 12804762.8, European Patent Office, Germany.
Chinese Office Action, May 5, 2015, Chinese Patent Application No. 201280037380.5, Chinese Patent Office, China.

* cited by examiner

REDUCING GAS GENERATORS AND METHODS FOR GENERATING A REDUCING GAS

CROSS REFERENCE TO RELATED APPLICATIONS

The present application is continuation-in-part of U.S. patent application Ser. No. 12/554,460, entitled Apparatus For Generating A Gas Which May Be Used For Startup And Shutdown Of A Fuel Cell, filed on Sep. 4, 2009 now U.S. Pat. No. 8,668,752 and U.S. patent application Ser. No. 12/554,039, entitled Method For Generating A Gas Which May Be Used For Startup And Shutdown Of A Fuel Cell, filed on Sep. 4, 2009, now U.S. Pat. No. 8,597,841 each of which is incorporated herein by reference.

GOVERNMENT RIGHTS IN PATENT

This invention was made with Government support under DE-FC26-08NT01911 awarded by the Department of Energy. The Government has certain rights in this invention.

FIELD OF THE INVENTION

The present invention relates to reducing gas, and more particularly, to systems and methods for generating a reducing gas.

BACKGROUND

Systems and methods for generating a reducing gas remain an area of interest. Some existing systems have various shortcomings, drawbacks, and disadvantages relative to certain applications. Accordingly, there remains a need for further contributions in this area of technology.

SUMMARY

One embodiment of the present invention is a unique reducing gas generator. Another embodiment is a unique method for generating a reducing gas. Other embodiments include apparatuses, systems, devices, hardware, methods, and combinations for generating reducing gas. Further embodiments, forms, features, aspects, benefits, and advantages of the present application will become apparent from the description and figures provided herewith.

BRIEF DESCRIPTION OF THE DRAWINGS

The description herein makes reference to the accompanying drawings, wherein like reference numerals refer to like parts throughout the several views, and wherein.

DETAILED DESCRIPTION

Figure 1:
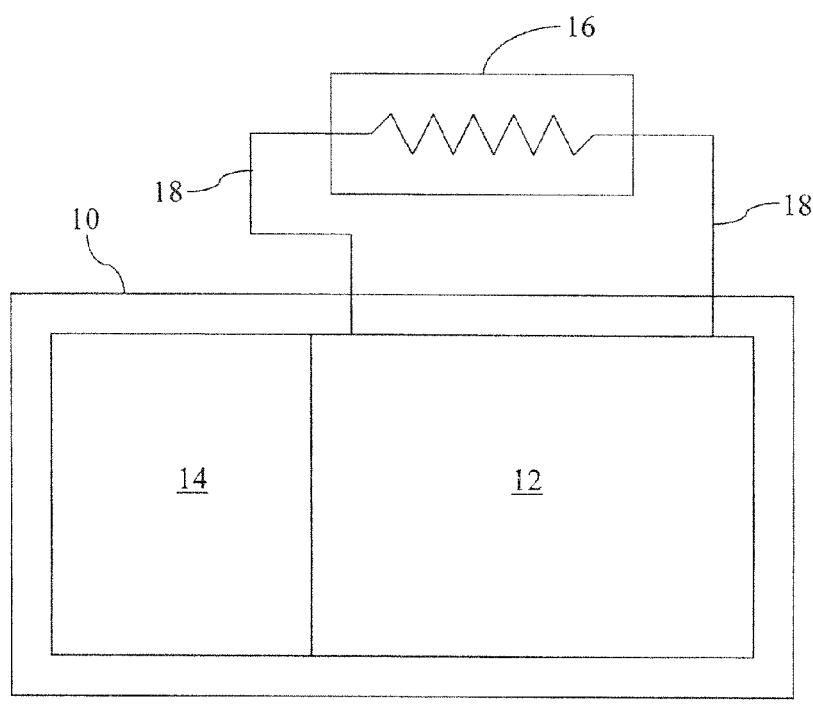
FIG. 1 schematically depicts a fuel cell system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the figures, and in particular, FIG. 1, a schematic of a fuel cell system 10 in accordance with an embodiment of the present invention is depicted. Fuel cell system 10 includes one or more of a fuel cell 12, and includes a reducing gas generator 14. Fuel cell system 10 is configured to provide power to an electrical load 16, e.g., via electrical power lines 18. In the present embodiment, fuel cell 12 is a solid oxide fuel cell (SOFC), although it will be understood that the present invention is equally applicable to other types of fuel cells, such as alkali fuel cells, molten-carbonate fuel cells (MCFC), phosphoric acid fuel cells (PAFC), and proton exchange membrane (PEM) fuel cells. In the present embodiment, fuel cell system 10 is suitable, but not limited to, use in a fuel cell turbine hybrid system where high-pressure feed streams are employed.

Reducing gas generator 14 of the present embodiment is configured to generate a reducing gas having a combustibles content (which is primarily hydrogen—$H_2$ and carbon monoxide—CO) that may be varied within a compositional range of approximately 3% combustibles content to approximately 45% combustibles content. In other embodiments, different compositional ranges may be employed, for example, a range of approximately 2% combustibles content to approximately 50% combustibles content in some embodiments, and approximately 1% combustibles content to approximately 60% combustibles content in other embodiments. As set forth below, reducing gas generator 14 of the present embodiment is tailored to yield a start gas in the form of a reducing gas having a primary function of protecting the anode of fuel cell 12 from oxidation during startup of fuel cell 12, e.g., during system heat-up prior to power generation. As power generation is started, the reducing gas is transitioned off.

In the embodiment of FIG. 1, various features, components and interrelationships therebetween of aspects of an embodiment of the present invention are depicted. However, the present invention is not limited to the particular embodiment of FIG. 1 and the components, features and interrelationships therebetween as are illustrated in FIG. 1 and described herein. For example, other embodiments encompassed by the present invention, the present invention being manifested by the principles explicitly and implicitly described herein via the present Figures and Detailed Description and set forth in the Claims, may include a greater or lesser number of components, features and/or interrelationships therebetween, and/or may employ different components and/or features having the same and/or different nature and/or interrelationships therebetween, which may be employed for performing similar and/or different functions relative to those illustrated in FIG. 1 and described herein.

Figure 2:
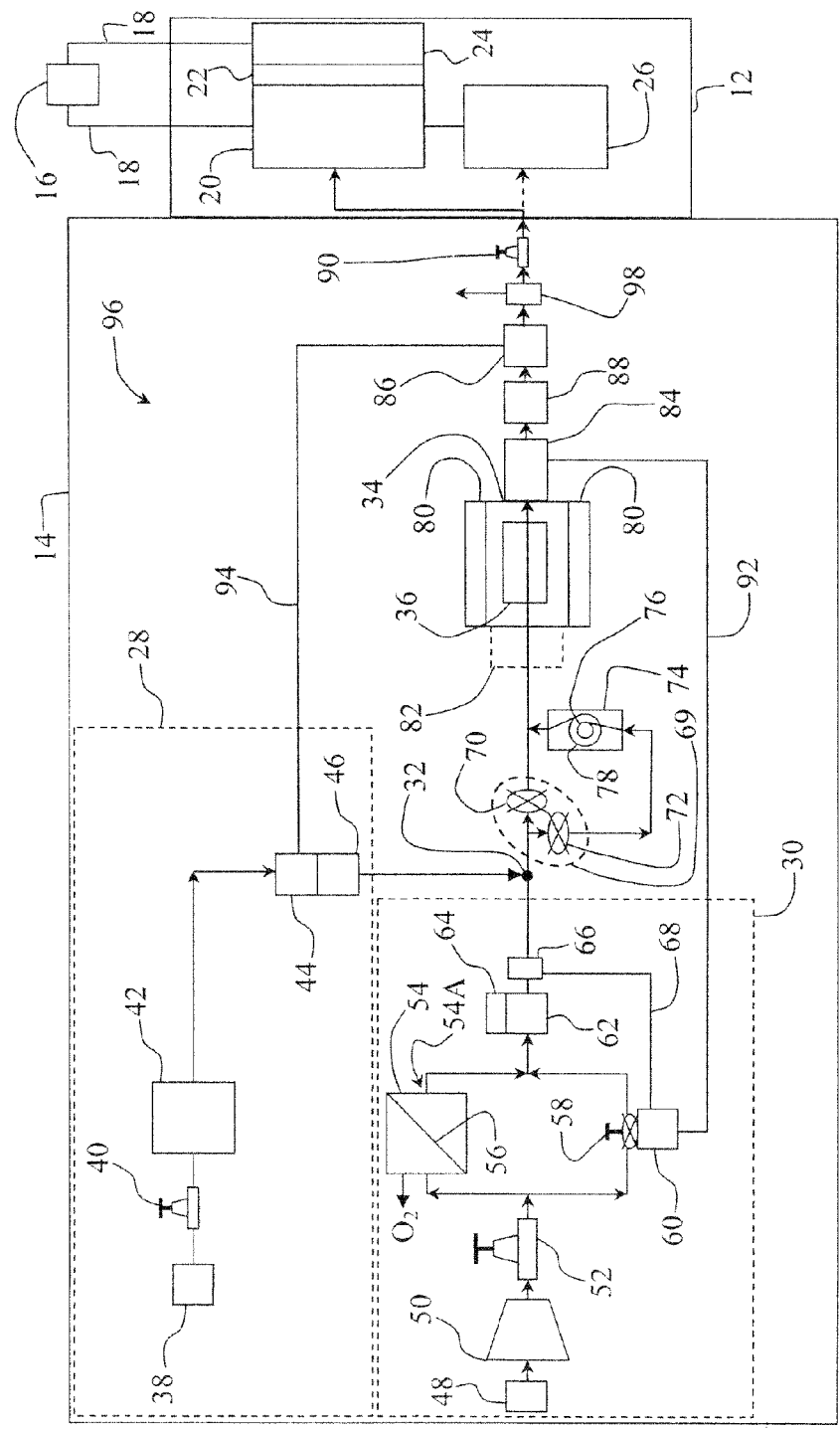
FIG. 2 schematically depicts the fuel cell system of FIG. 1 in greater detail, including a reducing gas generator in accordance with an embodiment of the present invention.

Referring now FIG. 2, fuel cell 12 and reducing gas generator 14 are described in greater detail. Fuel cell 12 includes at least one each of an anode 20, an electrolyte 22, a cathode 24, and a reformer 26. Anode 20, electrolyte 22 and cathode 24 are considered part of fuel cell 12. Reformer 26 is an internal steam reformer that receives steam as a constituent of a recycled fuel cell product gas stream, and heat for operation from fuel cell 12 electro chemical reactions. Reducing gas generator 14 is not a part of fuel cell 12, but rather, is configured for generating gases for use in starting up and shutting down fuel cell 12.

Anode 20 is electrically coupled to electrical load 16 via electrical power line 18, and cathode 24 is also electrically coupled to electrical load 16 via the other electrical power line 18. Electrolyte 22 is disposed between anode 20 and cathode 24. Anode 20 and cathode 24 are electrically conductive, and are permeable to oxygen, e.g., oxygen ions. Electrolyte 22 is configured to pass oxygen ions, and has little or no electrical conductivity, e.g., so as to prevent the passage of free electrons from cathode 24 to anode 20.

Reformer 26 is coupled to anode 20, and is configured to receive a fuel and an oxidant and to reform the fuel/oxidant mixture into a synthesis gas (syngas) consisting primarily of hydrogen ($H_2$), carbon monoxide (CO), as well as other reformer by-products, such as water vapor in the form of steam, and other gases, e.g., nitrogen and carbon-dioxide ($CO_2$), methane slip ($CH_4$), as well as trace amounts of hydrocarbon slip. In the present embodiment, the oxidant employed by fuel cell 12 during normal operations, i.e., in power production mode to supply electrical power to electrical load 16, is air, and the fuel is natural gas, although it will be understood that other oxidants and/or fuels may be employed without departing from the scope of the present invention.

The synthesis gas is oxidized in an electro-chemical reaction in anode 20 with oxygen ions received from cathode 24 via migration through electrolyte 22. The electro-chemical reaction creates water vapor and electricity in a form of free electrons on the anode that are used to power electrical load 16. The oxygen ions are created via a reduction of the cathode oxidant using the electrons returning from electrical load 16 into cathode 24.

Once fuel cell 12 is started, internal processes maintain the required temperature for normal power generating operations. However, in order to start the fuel cell, the primary fuel cell system components must be heated, including anode 20, electrolyte 22, cathode 24 and reformer 26.

In addition, some fuel cell 12 components may be protected from damage during the start-up, e.g., due to oxidation. For example, anode 20 may be subjected to oxidative damage in the presence of oxygen at temperatures above ambient but below the normal operating temperature of fuel cell 12 in the absence of the synthesis gas. Also, reformer 26 may need a specific chemistry, e.g. $H_2O$ in the form of steam in addition to the heat provided during start-up of fuel cell 12, in order to start the catalytic reactions that generate the synthesis gas. Further, it is desirable that fuel cell 12 be started in a safe manner, e.g., so as to prevent a combustible mixture from forming during the starting process. Thus, it may be desirable to purge anode 20 with a nonflammable reducing gas during the initial startup as the temperature of anode 20 increased. In one aspect, a characteristic of reducing gas generator 14 is that the reducing gas may be made sufficiently dilute in combustibles to prevent the potential formation of a flammable (i.e., potentially explosive) mixture upon mixing with air. This may be desirable during the low temperature portion of heat-up of fuel cell 12 where any combustibles mixing with air are below auto-ignition temperature, and therefore, can potentially build up to form dangerous quantities of potentially pressurized flammable gases within the vessel that contains fuel cell 12.

The reducing gas strength for protecting anode 20 of fuel cell 12 from oxygen migration can be quite high, e.g., up to 45% combustibles content in the present embodiment, up to 50% in other embodiments, and up to 60% combustibles content in still other embodiments. Mechanisms that cause the migration of oxygen through electrolyte 22 to the anode 20 side of the fuel cell 12 are often temperature dependent and include oxygen permeation through electrolyte 22 or oxygen transfer induced by short circuit currents. Also, physical leakage mechanisms may become worse with temperature as materials differentially expand. Thus, the ability of reducing gas generator 14 to increase combustibles content at high fuel cell 12 temperatures during startup may be particularly useful in protecting anode 20 from oxidation damage.

From a safety perspective, it may be possible to step to a greater reducing strength at higher temperatures during fuel cell 12 startup, since the possibility of mixing the reducing gas with a pressurized volume of air to form an combustible mixture in or near fuel cell 12 is reduced if the reducing gas is above auto-ignition temperature, because the reducing gas would tend to immediately burn upon mixing with air. In addition, this may prevent build-up of a flammable mixture that can potentially deflagrate if the mixture were to suddenly come in contact with an ignition source, since any such mixture would tend to burn immediately when above the auto-ignition temperature, rather than build up a large quantity of the mixture.

Thus, in some embodiments, it may be desirable to operate reducing gas generator 14 in a manner by which the reducing gas is initially weakly reducing and well below the flammability limit, e.g., 3% combustibles content in the present embodiment, although other values may be employed, for example, 2% combustibles content in some embodiments and 1% combustibles content or less in other embodiments. In still other embodiments, the combustibles content may be greater than 3%. The combustibles content may subsequently be changed to a strongly reducing (i.e., higher combustibles) condition (higher reducing strength) when temperature conditions in fuel cell 12, e.g., anode 20, are high enough to ensure that the reducing gas is far above its lower flammability limit. For example, the strongly reducing condition may be up to 45% combustibles content in the present embodiment, up to 50% combustibles content in other embodiments, and up to 60% combustibles content or greater in yet other embodiments, depending upon the conditions in fuel cell 12. The increased energy input to the system with a stronger reducing gas may be offset by decreasing fuel flow to the fuel cell power plant's Off-Gas Burner for such plants so equipped.

Accordingly, embodiments of the present invention may employ reducing gas generator 14 to generate a purging gas to purge fuel cell 12 of oxidants, in particular, cathode 24, as well as to generate a safe gas, i.e., a weak reducing gas having a relatively low level of combustibles.

In addition, embodiments of the present invention may also employ reducing gas generator 14 to produce a variable-reducing-strength reducing gas. The reducing gas composition provided by reducing gas generator 14 may also be configured to contain adequate steam to initiate the operation of the internal reformer 26 as the normal fuel cell 12 fuel stream flow, e.g., natural gas, is started. Accordingly, the reducing gas supplied to fuel cell 12 from reducing gas generator 14 may be considered a transition gas as power production by fuel cell 12 is ramped up. Additionally, reducing gas generator 14 of the present embodiment may be capable of rapid start-up, e.g., for protecting anode 20 in the event of emergency fuel cell 12 shutdown events, for example, by maintaining certain elements of reducing gas generator 14 at elevated temperatures in order to speed up initiation of the catalytic reactions that yield the reducing gas.

In the present embodiment, as illustrated in FIG. 2, reducing gas generator 14 includes a fuel system 28, an oxidant system 30, a merging chamber 32, and a catalytic reactor 34 having a catalyst 36. In the present embodiment, the outputs of fuel system 28 and oxidant system 30 are combined in merging chamber 32 and directed to fuel cell 12 via catalytic reactor 34 to selectively provide purging gas, safe gas, and variable strength reducing gas to anode 20 and reformer 26.

In the embodiment depicted in FIG. 2, various features, components and interrelationships therebetween of aspects of an embodiment of the present invention are depicted. However, the present invention is not limited to the particular embodiment of FIG. 2 and the components, features and interrelationships therebetween as are illustrated in FIG. 2 and described herein. For example, other embodiments encompassed by the present invention, the present invention being manifested by the principles explicitly and implicitly described herein via the present Figures and Detailed Description and set forth in the Claims, may include a greater or lesser number of components, features and/or interrelationships therebetween, and/or may employ different components and/or features having the same and/or different nature and/or interrelationships therebetween, which may be employed for performing similar and/or different functions relative to those illustrated in FIG. 2 and described herein.

In any event, in the embodiment of FIG. 2, fuel system 28 includes a fuel input 38, a pressure regulator 40, a sulfur capture sorbent 42, a fuel flow controller 44, and a variable position/output fuel control valve 46. Fuel input 38 is configured to receive a hydrocarbon fuel, e.g., natural gas, and serves as a source of the hydrocarbon fuel used by reducing gas generator 14. Pressure regulator 40 is fluidly coupled to fuel inlet 38, and regulates the pressure of the hydrocarbon fuel. Sulfur capture sorbent 42 is fluidly coupled to pressure regulator 40, and is configured to capture sulfur from the fuel stream received from pressure regulator 40. Fuel flow controller 44 and fuel control valve 46 are coupled to the output of sulfur capture sorbent 42, and are configured to control the amount of fuel delivered to merging chamber 32.

Oxidant system 30 functions as an oxidant source for reducing gas generator 14, and includes an air intake 48, an air compressor 50 as a pressurized air source, a pressure regulator 52, a nitrogen generator 54 having a nitrogen separation membrane 56, a variable position/output air control valve 58, an air flow controller 60, a variable position/output oxidant control valve 62, an oxidant flow controller 64 and an oxygen sensor 66.

Air intake 48 may be any structure or opening capable of providing air, and is fluidly coupled to air compressor 50, which compresses ambient air received from the atmosphere. Pressure regulator 52 is fluidly coupled to air compressor 50, and regulates the air pressure delivered to reducing gas generator 14. Air control valve 58 is part of an air charging system structured to variably add air to the nitrogen-rich gas received from nitrogen generator 54 to yield an oxidant having a variable $O_2$ content.

The $O_2$ content may be sensed by oxygen sensor 66, which may be used by the control system of reducing gas generator 14 to vary the $O_2$ content of the oxidant supplied to merging chamber 32. For example, under normal operating conditions, the $O_2$ content is controlled based on a control temperature, e.g., the temperature of catalyst 36 in the present embodiment, although other temperatures may be used in other embodiments, e.g., the temperature of the reducing gas output by reducing gas generator 14. However, during startup of reducing gas generator 14, oxygen sensor 66 may be used to provide feedback until the temperature is available as a feedback. The amount or flow of the oxidant having the variable $O_2$ content is controlled by oxidant control valve 62 and oxidant flow controller 64.

Nitrogen generator 54 is configured to generate a nitrogen-rich stream, which may be used as a purging gas, and which may also be combined with air to form a low oxygen ($O_2$) content oxidant stream, e.g., a nitrogen-diluted air stream, used by reducing gas generator 14 to form a reducing gas. The purity of the nitrogen-rich stream may vary with the needs of the particular application, for example, and may consist essentially of nitrogen. Alternatively, it is considered that in other embodiments, other gases may be employed in place of or in addition to nitrogen, such as argon or helium, for use as a purging gas and/or as a constituent of a low $O_2$ content oxidant stream, e.g., as a dilutant (diluent) of air. As used herein, "low $O_2$ content oxidant" means that the oxygen content of the oxidant stream is less than that of atmospheric air under the same pressure and temperature conditions.

Nitrogen generator 54 and air control valve 58 are fluidly coupled in parallel to pressure regulator 52, and receive pressurized air from air compressor 50 for use in reducing gas generator 14 operations. Nitrogen generator 54 has an output 54A, e.g., an opening or passage structured to discharge the products of nitrogen generator 54. Nitrogen generator 54 is structured to receive air from air intake 48, extract oxygen ($O_2$) from the air, and to discharge the balance in the form of a nitrogen-rich gas from the outlet. The extracted $O_2$ is discharged from nitrogen generator 54 to the atmosphere in the present embodiment, although it will be understood that in other embodiments, the extracted $O_2$ may be employed for other purposes related to fuel cell 12 and/or reducing gas generator 14, e.g., as part of an oxidant stream.

Nitrogen separation membrane 56 of nitrogen generator 54 is configured to separate oxygen out of the air received from air intake 48, and provides the nitrogen-rich stream, which is then combined with the air supplied by air control valve 58 to yield the low $O_2$ content oxidant, which is delivered to oxidant control valve 62. Oxidant control valve 62 is fluidly coupled to the outputs of both nitrogen generator 54 and air control valve 58. Oxygen sensor 66, which may be in the form of an $O_2$ analyzer, is fluidly coupled downstream to oxidant control valve 62, and provides a control signal via control line 68 that communicatively couples oxygen sensor 66 with air flow controller 60. Air flow controller 60 provides control signals to air control valve 58 to control the amount of air added to the nitrogen-rich stream based on the control input from oxygen sensor 66.

Merging chamber 32 is in fluid communication with the output of nitrogen generator 54 and fuel input 38, and is structured to receive and combine the hydrocarbon fuel and nitrogen-rich gas and discharge a feed mixture containing both the fuel and the oxidant including the nitrogen-rich gas to catalytic reactor 34. Catalytic reactor 34 is structured to receive the feed mixture and to catalytically convert the feed mixture into a reducing gas. The form of merging chamber 32 is a simple plumbing connection joining the oxidant stream with the fuel stream in the present embodiment, although any arrangement that is structured to combine an oxidant stream with a fuel stream may be employed without departing from the scope of the present invention. For example, a dedicated mixing chamber having swirler vanes to mix the streams may be employed.

Reducing gas generator 14 includes a start control valve 69 having a valve element 70 and a valve element 72; and a feed mixture heater 74, which may be used to start the process of generating reducing gas. In one form, valve elements 70 and 72 are part of a combined valving element. The inlets of valve elements 70 and 72 are fluidly coupled to merging chamber 32 downstream thereof. The outlet of valve element 70 is fluidly coupled to catalytic reactor 34 for providing the feed mixture to catalyst 36 of catalytic reactor 34. The outlet of valve element 72 is fluidly coupled to the inlet of feed mixture heater 74. In one form, start control valve 69 is a three-way valve that operates valve elements 70 and 72 to direct flow entering valve 69 into catalytic reactor 34 directly or via feed mixture heater 74. It is alternatively considered that other valve arrangements may be employed, such as a pair of individual start control valves in place of start control valve 69 with valve elements 70 and 72.

Feed mixture heater 74 includes a heating body 76 and a flow coil 78 disposed adjacent to heating body 76. The outlet of feed mixture heater 74 is fluidly coupled to catalytic reactor 34 for providing heated feed mixture to catalyst 36 of catalytic reactor 34. In the normal operating mode, valve elements 70 and 72 direct all of the feed mixture directly to the catalytic reactor 34. In the startup mode, the feed mixture is directed through feed mixture heater 74. In one form, all of the feed mixture is directed through feed mixture heater 74, although in other embodiments, lesser amounts may be heated.

Feed mixture heater 74 is configured to "light" the catalyst 36 of catalytic reactor 34 (initiate the catalytic reaction of fuel and oxidant) by heating the feed mixture, which is then supplied to catalytic reactor 34. In one form, the feed mixture is heated by feed mixture heater 74 to a preheat temperature above the catalyst light-off temperature of the feed mixture (the catalyst light-off temperature is the temperature at which reactions are initiated over the catalyst, e.g., catalyst 36). Once catalyst 36 is lit, the exothermic reactions taking place at catalyst 36 maintain the temperature of catalytic reactor 34 at a controlled level, as set forth below. Also, once catalyst 36 is lit it may no longer be necessary to heat the feed mixture, in which case valve elements 70 and 72 are positioned to direct all of the feed mixture directly to the catalytic reactor 34, bypassing feed mixture heater 74.

In order to provide for a quick supply of reducing gas in the event of a sudden shutdown of fuel cell 12, heating body 76 is configured to continuously maintain a temperature sufficient to light catalyst 36 during normal power production operations of fuel cell 12. That is, while fuel cell 12 is operating in power production mode to supply power to electrical load 16, which is the normal operating mode for fuel cell 12, heating body 76 maintains a preheat temperature sufficient to heat the feed mixture in order to be able to rapidly light the catalyst for startup of reducing gas generator 14 so that reducing gas may be supplied to fuel cell 12 during shutdown.

In addition, one or more catalyst heaters 80 are disposed adjacent to catalytic reactor 34, and are configured to heat catalyst 36 and maintain catalyst 36 at a preheat temperature that is at or above the catalyst light-off temperature for the feed mixture supplied to catalytic reactor 34. This preheat temperature is maintained during normal operations of fuel cell 12 in power production mode in the event of a sudden need for reducing gas, e.g., in the event of the need for a shutdown of fuel cell 12.

In other embodiments, it is alternatively considered that another heater 82 may be used in place of or in addition to heaters 74 and 80, e.g., a heater 82 positioned adjacent to catalytic reactor 34 on the upstream side. Such an arrangement may be employed to supply heat more directly to catalyst 36 in order to initiate catalytic reaction of the feed mixture in an upstream portion of catalytic reactor 34.

In the present embodiment, heaters 74, 80 and 82 are electrical heaters, although it is alternatively considered that in other embodiments, indirect combustion heaters may be employed in addition to or in place of electrical heaters. Also, although the present embodiment employs both feed mixture heater 74 and heaters 80 to rapidly light the feed mixture on the catalyst, it is alternatively considered that in other embodiments, only one such heater may be employed, or a greater number of heaters may be employed, without departing from the scope of the present invention.

A control temperature sensor 84 is positioned adjacent catalyst 36 of catalytic reactor 34, and is structured to measure the temperature of catalyst 36. In one form, control temperature sensor 84 is structured to provide a signal indicating the temperature of a portion of catalyst 36 via a sense line 92 that communicatively couples air flow controller 60 with control temperature sensor 84. The control temperature is a temperature employed by control system 96 in regulating the output of reducing gas generator 14. Air flow controller 60 is configured to direct the operations of air control valve 58 based on the signal received from control temperature sensor 84 in conjunction with the signal received from oxygen sensor 66. In another form, other temperatures may be sensed for purposes of controlling reducing gas generator 14. For example, in one such embodiment, the temperature of the reducing gas produced by reducing gas generator 14, e.g., as output by catalytic reactor 34, may be measured and used as a control temperature feedback to direct the operations of air control valve 58.

A reducing gas combustibles detection sensor 86, which in the present embodiment is in the form of a hydrogen ($H_2$) sensor or $H_2$ analyzer, is configured to determine the quantity of one or more combustibles, e.g., percent mole, present in the reducing gas output by catalytic reactor 34. In other embodiments, reducing gas combustibles detection sensor 86 may be in the form of a carbon monoxide (CO) sensor or analyzer in addition to or in place of the $H_2$ sensor/analyzer. In any case, a control line 94 communicatively couples fuel flow controller 44 and reducing gas combustibles detection sensor 86. Reducing gas combustibles detection sensor 86 is configured to supply a signal reflecting the combustibles content of the reducing gas to fuel flow controller 44. Fuel flow controller 44 is configured to control the amount of fuel delivered to merging chamber 32.

The reducing gas output by catalytic reactor 34 is cooled using a heat exchanger 88. In one form, heat exchanger 88 is an indirect heat exchanger. In other embodiments, other types of heat exchangers may be employed. In one form, reducing gas combustibles detection sensor 86 is positioned downstream of heat exchanger 88. In other forms, reducing gas combustibles detection sensor 86 may positioned in other locations, for example, upstream of heat exchanger 88 or inside of or mounted on heat exchanger 88.

The pressure output of catalytic reactor 34 is maintained by a backpressure regulator 90 downstream of heat exchanger 88. Heat exchanger 88 maintains the temperature of the reducing gas downstream of catalytic reactor 34 at a suitable level to prevent damage to backpressure regulator 90. In one form, the reducing gas is cooled to between 100° C. and 150° C. using cooling air. In other embodiments, other suitable fluids may be used as the heat sink, and other temperatures may be used. In one form, a control loop (not shown) may be used to control the temperature of the reducing gas exiting heat exchanger 88 by varying the flow of cooling air or other cooling fluid.

The output of reducing gas generator 14 is fluidly coupled to catalytic reactor 34, and is in fluid communication with anode 20, e.g., either directly or via reformer 26. The output of backpressure regulator 90 serves as a reducing gas output in the present embodiment, and is operative to direct the reducing gas to anode 20 and reformer 26. The "reducing gas output" is the output of reducing gas generator 14 that discharges the product of reducing gas generator 14 into fuel cell 12, and may be one or more of any opening or passage structured to discharge the products of reducing gas generator 14.

Fuel flow controller 44, air flow controller 60 and oxidant flow controller 64 form a control system 96 that is structured to control the temperature and chemical makeup of the product mixture supplied from catalytic reactor 34 based on the signals output by oxygen sensor 66 (during startup in the present embodiment), control temperature sensor 84 and reducing gas combustibles detection sensor 86. In particular, air control valve 58 is controlled by air flow controller 60 to regulate the $O_2$ content of the oxidant stream supplied to merging chamber 32, e.g., the amount of $O_2$ expressed as a mole percentage of the $O_2$ in the oxidant stream. Oxidant control valve 62 is controlled by oxidant flow controller 64 to regulate flow of the oxidant stream formed of nitrogen-rich gas and air supplied to merging chamber 32. Fuel control valve 46 is controlled by fuel flow controller 44 to regulate the amount of hydrocarbon fuel supplied to merging chamber 32.

Thus, in the present embodiment, control system 96 is configured to control the oxygen ($O_2$) content of the oxidant stream, and to also control the oxidant/fuel ratio of the feed mixture, which is defined by a ratio of the amount of the oxidant in the feed mixture to the amount of hydrocarbon fuel in the feed mixture, e.g., the mass flow rate of the oxidant stream relative to the mass flow rate of the hydrocarbon fuel stream. In particular, the $O_2$ content of the oxidant stream supplied to merging chamber 32 is controlled by air control valve 58 via the output of air flow controller 60 based on the signal received from oxygen sensor 66. In addition, the oxidant/fuel ratio of the feed mixture supplied to catalytic reactor 34 is controlled by fuel control valve 46 and oxidant control valve 62 under the direction of fuel flow controller 44 and oxidant flow controller 64, respectively. In one form, the flow of reducing gas output by reducing gas generator 14 is controlled by oxidant control valve 62, e.g., including an offset or other compensation to account for the amount of fuel in the feed mixture, whereas the oxidant/fuel ratio is then controlled using fuel control valve 46. In other embodiments, other control schemes may be employed.

In the present embodiment, each of fuel flow controller 44, air flow controller 60 and oxidant flow controller 64 are microprocessor-based, and execute program instructions in the form of software in order to perform the acts described herein. However, it is alternatively contemplated that each such controller and the corresponding program instructions may be in the form of any combination of software, firmware and hardware, and may reflect the output of discreet devices and/or integrated circuits, which may be co-located at a particular location or distributed across more than one location, including any digital and/or analog devices configured to achieve the same or similar results as a processor-based controller executing software or firmware based instructions, without departing from the scope of the present invention.

Further, it will be understood that each of fuel flow controller 44, air flow controller 60 and oxidant flow controller 64 may be part of a single integrated control system, e.g., a microcomputer, without departing from the scope of the present invention.

In any event, control system 96 is configured to execute program instructions to both vary the $O_2$ content of the oxidant stream and vary the oxidant/fuel ratio of the feed mixture while maintaining a selected temperature of the reducing gas in order to achieve a selected combustibles content at desired flow rate. The flow rate may be varied, e.g., depending upon the particular application or operational phase. Control system 96 varies the $O_2$ content of the oxidant stream and the oxidant/fuel ratio of the feed mixture based on the output of control temperature sensor 84, oxygen sensor 66 and reducing gas combustibles detection sensor 86.

Reducing gas generator 14 may be employed during startup and shutdown of fuel cell 12, e.g., to provide reducing gas of various reducing strengths, including reducing gas in the form of a safe (non-flammable) gas, and in some embodiments, to provide a purging gas with no combustibles.

The reducing gas is generated by combining the nitrogen-rich stream with air supplied via air control valve 58 to form the oxidant stream, which is regulated by oxidant control valve 62 and combined with the hydrocarbon fuel supplied via fuel control valve 46 to form the feed mixture that is catalytically converted in catalytic reactor 34 into the reducing gas. As set forth herein, the $O_2$ content of the oxidant stream and the oxidant fuel ratio of the feed mixture are varied by control system 96 in order to both regulate the control temperature, e.g., at catalytic reactor 34, while also controlling the reducing strength of the reducing gas to achieve the selected combustibles content at the desired flow rate.

The combustibles content may be selected in order to provide the appropriate reducing gas chemical configuration during various phases in the fuel cell 12 startup and shut down processes. In the present embodiment, control system 96 is structured to maintain the control temperature, e.g., the catalyst 36 temperature, while varying the combustibles content. For example, the reducing strength may be varied from weakly reducing, i.e., a low reducing strength, for purposes of forming a safe gas, to a high reducing strength having greater combustibles content. The combustibles content is primarily in the form of hydrogen ($H_2$) and carbon monoxide (CO).

The safe gas may be supplied to fuel cell 12 during ramp up to fuel cell 12 operating temperature. In one form, the reducing gas may be supplied to fuel cell 12 in the form of a safe gas to transition reformer 26 into service. In another form, as the operating temperature of fuel cell 12 increases, e.g., the temperature of anode 20 and reformer 26, the strength of the reducing gas may be increased by increasing the combustibles content of the reducing gas, which may thus protect anode 20 at the higher temperatures at which a significant amount of oxidation damage may otherwise occur, e.g., due to oxygen migration through electrolyte 22 or other leakages. In addition, as anode 20 (and/or reformer 26, in some embodiments) approaches normal operating temperatures, the combustibles content of the reducing gas may be further increased to achieve combustibles content levels similar to that of the synthesis gas that is produced by reformer 26 during normal power generation operations of fuel cell 12, which may help initiate the normal electrical power-producing reactions of anode 20. In embodiments where supplied to reformer 26, this may help initiate the normal operating catalytic reactions of reformer 26.

Regarding the purging gas, in some embodiments, a non-combustible purging gas may be generated by nitrogen generator 54 in the form of a nitrogen-rich stream, e.g., consisting primarily of nitrogen, which may supplied to fuel cell 12 via back pressure regulator 90, although other plumbing schemes to direct the output of nitrogen generator 54 to fuel cell 12 may alternatively be employed. In one form, the purging gas may be supplied to fuel cell 12, e.g., to purge one or more of cathode 24 and/or other fuel cell 12 components, e.g., when a cold start of fuel cell 12 is desired. In another form, the purging gas may be supplied to fuel cell 12 to purge fuel cell 12 before maintenance. In yet another form, nitrogen generator 54 and/or a second nitrogen generator may be employed to create a purge gas. For example, in the event of a loss of the power plant's main air supply during an emergency shutdown, a nitrogen rich cathode purge may be supplied to cathode 24 with, e.g., using nitrogen generator 54 and/or a second nitrogen generator, while nitrogen generator 54 is used to generate the reducing gas supplied to the anode 20 loop. Such embodiments may be used to ensure that "safe" non-flammable mixtures reside in the fuel cell 12 vessel.

Having thus described exemplary means for varying the combustibles content of the reducing gas output by catalytic reactor 34 while maintaining a constant reducing gas output temperature from catalytic reactor 34, including means for varying the $O_2$ content in oxidant supplied to merging chamber 32 and means for varying the oxidant/fuel ratio of feed mixture exiting merging chamber 32, an exemplary embodiment of a method for generating a purging gas and a reducing gas for startup and shutdown of a fuel cell is described as follows. The exemplary embodiment is described with respect to FIGS. 3A-3D, which form a flowchart having control blocks B100-B146 depicting a method for starting up and shutting down a fuel cell. Although a particular sequence of events is illustrated and described herein, it will be understood that the present invention is not so limited, and that other sequences having the same or different acts in lesser or greater numbers and in the same or different order may be employed without departing from the scope of the present invention.

Figure 3A:
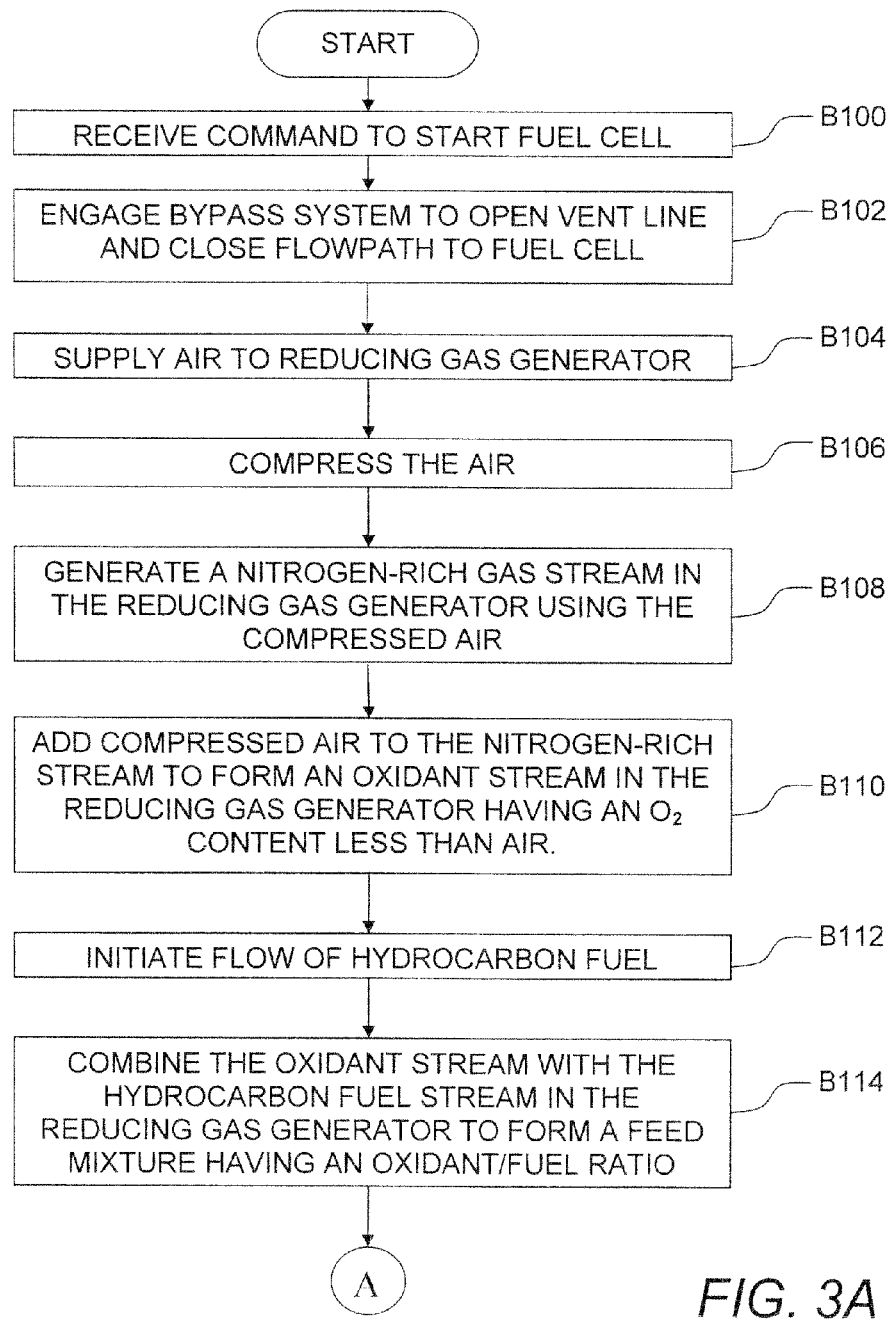
FIGS. 3A-3D are a flowchart depicting a method for startup and shutdown of a fuel cell using a reducing gas generator in accordance with an embodiment of the present invention.

Referring now to FIG. 3A, at block B100, a command to start fuel cell 12 is received by control system 96, e.g., via an operator of fuel cell 12.

At block B102, a bypass system 98 is engaged. Bypass system 98 opens a vent line to vent the output of reducing gas generator 14, and closes the flowpath to fuel cell 12. The output of reducing gas generator is vented until the control loop, e.g., control system 96, holds process parameters within their prescribed bounds, at which point bypass system 98 closes the vent line and opens the flowpath to fuel cell 12.

At block B104, air is supplied to reducing gas generator 14, e.g., via air intake 48, by initiating operation of air compressor 50.

At block B106, air compressor 50 compresses the air received from air intake 48. In one form, the air is compressed to a pressure in a range from 5 bar absolute to 14 bar absolute. In other embodiments, the pressure of the compressed air may fall within a different range, for example, in a range from 2 bar absolute to 25 bar absolute in some embodiments, and in other embodiments, 1 bar absolute to 30 bar absolute. The pressure supplied by air compressor 50 may vary, for example, depending upon the characteristics of nitrogen separation membrane 56 and nitrogen generator 54.

At block B108, the nitrogen-rich gas stream is generated in nitrogen generator 54 of reducing gas generator 14 by supplying the compressed air to nitrogen separation membrane 56. The $O_2$ removed from the air by nitrogen separation membrane 56 as a byproduct of the nitrogen generation process is directed offboard, e.g., for use elsewhere, or simply vented, whereas the resulting nitrogen-rich stream is directed toward oxidant control valve 62. In the present embodiment, the nitrogen-rich stream contains oxygen, albeit at levels lower than that of ambient air. In other embodiments, the nitrogen stream may consist essentially of nitrogen (e.g., <1% $O_2$).

At block B110, compressed air is added to the nitrogen-rich stream in a controlled manner by air control valve 58 under the direction of air flow controller 60 to form a low oxygen ($O_2$) content oxidant stream, i.e., an oxidant stream having less $O_2$ than ambient atmospheric air.

At block B112, a flow of hydrocarbon fuel to reducing gas generator 14 is initiated by fuel control valve 46 under the direction of fuel flow controller 44. Fuel flow may be initially set to a default value anticipated to achieve the desired combustibles content of the reducing gas and the control temperature, and may be subsequently adjusted.

At block B114, the oxidant stream is combined with the hydrocarbon fuel stream in merging chamber 32 to form the feed mixture having an oxidant/fuel ratio, e.g., defined by a ratio of the mass flow rate of the oxidant stream in the feed mixture to the mass flow rate of the hydrocarbon fuel stream in the feed mixture.

Figure 3B:
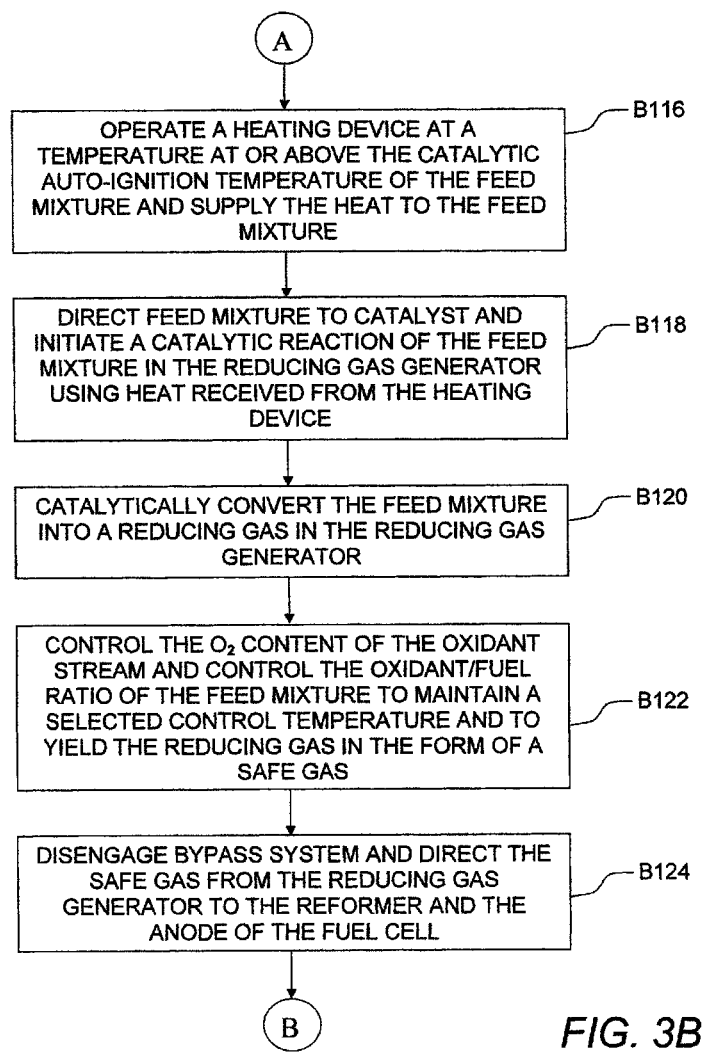

Referring now to FIG. 3B, at block B116, heating devices are operated at a temperature at or above the catalyst light-off temperature of the feed mixture, and the heat output by the heating devices is supplied to the feed mixture. In one form, the heating devices are turned on immediately after receiving the command to start the fuel cell 12, e.g., immediately after block B100. In other embodiments, the heating devices may be turned on at other times suitable to the application, e.g., depending upon how much time it takes the heaters to reach the desired temperature. In the present embodiment, the heating devices are feed mixture heater 74 and heater 80, although in other embodiments, only one heater may be employed or a plurality of heaters may be employed in place of or in addition to one or both of feed mixture heater 74 and heater 80. The types or forms of heaters used in other embodiments may vary with the needs of the application.

Heating body 76 and flow coil 78 are maintained at or above the catalyst light-off temperature of the feed mixture. The heat from heating body 76 and flow coil 78 is supplied to the feed mixture by diverting feed mixture through feed mixture heater 74, in particular, flow coil 78. In one form, all of the feed mixture is diverted through feed mixture heater 74. In another form, a portion of the feed mixture is diverted through feed mixture heater 74. The feed mixture is diverted to flow coil 78 by controlling the output of start control valve 69 to operate valve elements 70 and 72. The resulting heated feed mixture is directed to catalyst 36 of catalytic reactor 34 to help initiate the catalytic reactions that yield reducing gas. Once the catalytic reactions in catalytic reactor 34 have been started, three-way start control valve 69 is re-oriented to direct all of the feed mixture directly to catalytic reactor 34, bypassing feed mixture heater 74. While the present application is described using a feed mixture heater 74 with heating body 76 and flow coil 78, it will be understood that other types of heaters may be employed in embodiments that utilize a flow mixture heater.

Heater 80 of the present embodiment is in the form an electric band heater, and maintains catalyst 36 at or above the catalyst light-off temperature of the feed mixture, thereby promoting rapid lighting (hence, re-lighting) of catalyst 36. It will be understood that other types of heaters may be employed without departing from the scope of the present invention.

In other embodiments, heater 82 may be employed to heat catalyst 36 at or near the location where the feed mixture is supplied to catalyst 36 in order to initiate the catalytic reactions. In various other embodiments, one or more heaters 82 may be used in place of or in addition to heaters 74 and 80.

At block B118, the heated feed mixture is directed to catalyst 36, where catalytic reactions are initiated. In one form, the catalytic reactions are initiated based on the heat received from feed mixture heater 74. In various other forms, the reactions may be initiated based on heat received from feed mixture heater 74 and/or heater 80 and/or heater 82).

At block B120, the feed mixture is catalytically converted to reducing gas in catalytic reactor 34 of reducing gas generator 14.

At block B122, the $O_2$ content of the oxidant stream and the oxidant/fuel ratio of the feed mixture are each controlled by control system 96 to maintain the selected control temperature of the reducing gas and to yield the reducing gas in the form of a safe gas. In one form, the $O_2$ content of the oxidant stream is controlled by air flow controller 60 directing the operations of air control valve 58, although in other embodiments, the $O_2$ content of the oxidant stream may be controlled differently. In one form, the oxidant/fuel ratio is controlled by fuel flow controller 44 directing the operations of respective fuel control valve 46, although in other embodiments, the oxidant/fuel ratio may be controlled differently. Prior to reaching the control temperature, control of the $O_2$ content may be based on the output of oxygen sensor 66. Once a temperature indicating catalytic combustion is achieved, the control algorithm switches to feedback based on control temperature sensor 84. The control temperature in some embodiments may be, for example, a function of reducing gas flow rate (catalyst load), time at service, or some other operating parameter. In other embodiments, the output of either or both of oxygen sensor 66 and control temperature sensor 84 may be employed during system startup and/or normal operation.

The flow rate of the feed mixture is controlled primarily by oxidant flow controller 64 directing the operations of oxidant control valve 62. In the form of a safe gas, i.e., a weakly reducing gas mixture, the reducing gas may have a combustibles content (e.g., predominantly $CO+H_2$) of approximately 4.5%. Other reducing gases having greater or lesser percentages of combustibles content may be employed without departing from the scope of the present invention.

Because the mass flow of the feed mixture is based predominantly on the flow rate of the oxidant flow stream, the total flow of the feed mixture, and hence the reducing gas output by reducing gas generator 14, is based primarily on the flow rate of the oxidant control flow stream as governed by oxidant flow controller 64. The selected control temperature in the present embodiment is 800° C., which is measured at one of the hottest points in catalyst 36, and which in the present embodiment yields a bulk average temperature of 770° C. The selected temperature in the present embodiment is a predetermined temperature value selected based on life considerations for components of reducing gas generator 14 and fuel cell 12, as well as catalytic conversion efficiency. Other temperature values and measurement locations may be employed in other embodiments.

At block B124, bypass system 98 is disengaged from the bypass mode, and the reducing gas in the form of a safe gas is thus directed from reducing gas generator 14 to anode 20 of fuel cell 12. In other embodiments, the safe gas may be directed to reformer 26.

Figure 3C:
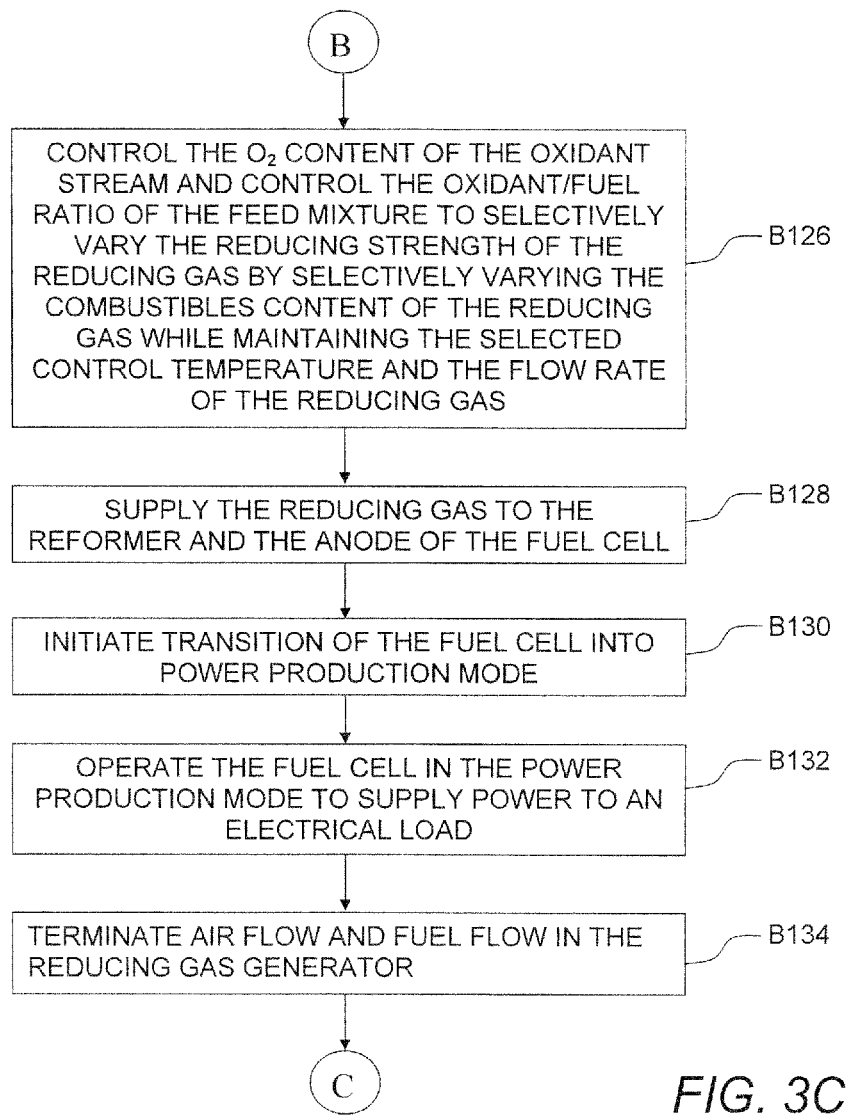

Referring now to FIG. 3C, a block B126 is illustrated. In one form, block B126 is bypassed, and process flow proceeds directly to block B128. In another form, at block B126 the $O_2$ content of the oxidant stream and the oxidant/fuel ratio of the feed mixture are controlled to selectively vary the reducing strength of the reducing gas by selectively varying the combustibles content of the reducing gas while maintaining the selected temperature of the reducing gas of block B122. As set forth above with respect to block B122, in one form, the $O_2$ content of the oxidant stream is controlled by air flow controller 60 directing the operations of air control valve 58. In other forms, the $O_2$ content of the oxidant stream may be controlled differently. In one form, the oxidant/fuel ratio is primarily controlled by fuel flow controller 44, and the reducing gas flow is primarily controlled by oxidant flow controller 64 directing the operations of oxidant control valve 62. In other forms, the oxidant/fuel ratio and reducing gas flow rate may be controlled differently.

Control of the $O_2$ content of the oxidant stream and of the oxidant/fuel ratio of the feed mixture to selectively vary the reducing strength of the reducing gas while maintaining the selected temperature and flow rate of the reducing gas output by catalytic reactor 34 in the present embodiment is now described.

Reducing gas generator 14 catalytically converts the low $O_2$ content oxidant and hydrocarbon fuel to form the reducing gas with sufficient combustibles content to protect fuel cell anode 20 of fuel cell 12 during start-up and shutdown of the fuel cell system 10 power plant. By adjusting the $O_2$ content of the oxidant gas in combination with changing the oxidant/fuel ratio, the reducing gas strength may be changed while the catalyst operating temperature is held constant, e.g., at an ideal conversion temperature. This temperature is sensed by control temperature sensor 84 and used as input to control system 96 for use in maintaining the output temperature of catalytic reactor 34 at the selected temperature.

Figure 4:
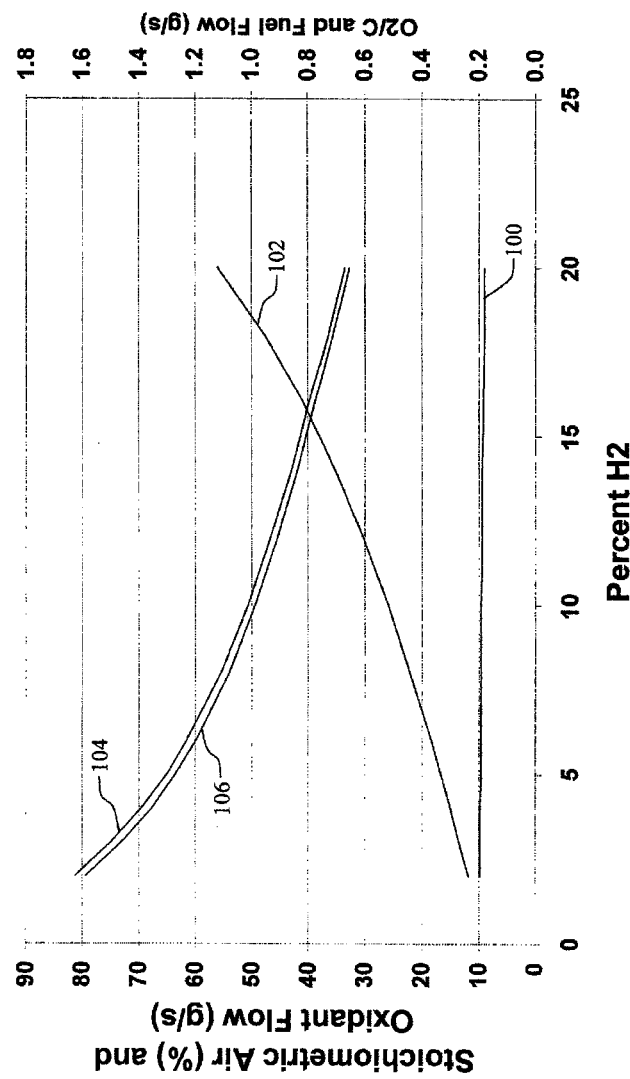
FIG. 4 is a plot depicting catalytic conversion parameters in a catalytic reactor of a reducing gas generator in accordance with an embodiment of the present invention.

Referring now to FIG. 4, an example of catalytic reactor 34 parameters is depicted. The illustrated parameters include oxidant stream mass flow rate 100; hydrocarbon fuel stream mass flow rate 102; percent (%) stoichiometric air 104, which represents the percentage amount of air in the oxidant stream relative to the amount of air required for complete combustion of the hydrocarbon fuel stream; and the oxygen/carbon ratio ($O_2/C$) 106. In the plot of FIG. 4, the abscissa is $H_2$ content of the reducing gas, the left-hand ordinate is in units of percent and also grams per second (g/s), against which % stoichiometric air 104 and oxidant stream mass flow rate 100 are plotted. The right-hand ordinate is in units of both molar fraction and g/s, against which $O_2/C$ ratio 106 and hydrocarbon fuel stream mass flow rate 102 are plotted.

FIG. 4 illustrates catalytic reactor 34 operating parameters over a reducing gas compositional range of 2% to 20% $H_2$ and 1% to 10% CO (3% to 30% CO+H2). To produce higher combustibles content ($CO+H_2$), the $O_2$ content in the oxidant is raised. At a constant oxidant/fuel ratio of the feed mixture, e.g., air to fuel ratio, raising the $O_2$ content in the oxidant stream reduces combustibles and raises operating temperature. However, in the present embodiment, as the $O_2$ content in the oxidant stream is increased, the oxidant/fuel ratio of the feed mixture is simultaneously decreased, i.e., made more fuel rich, in order to achieve higher combustibles content at the same operating temperature.

By varying both the $O_2$ content in the oxidant stream and the oxidant/fuel ratio of the feed mixture, a broad range of reducing gas strengths may be achieved at a selected catalyst operating temperature, e.g., 770° C. in the present embodiment. For example, in one form, the range may extend from a reducing gas strength that represents normal operating conditions for reformer 26 (~45% $CO+H_2$) to weakly reducing conditions (~3% $CO+H_2$). In other forms, different ranges may be employed, e.g., as set forth herein.

As 20% H$_2$ content in the reducing gas is approached, conditions in catalytic reactor 34 may approach that normally occurring in reformer 26 in power production mode as the oxidant approaches air with respect to % O$_2$ content and the O$_2$ to C molar ratio reaches 0.65. As the reducing gas becomes richer in combustibles, the fuel flow may increase by a factor of about 4 at 20% H$_2$ relative to weakly reducing conditions. The percentage of the fuel burned may decrease significantly as conditions approach those in the reformer 26. The temperature may be sustained because the lower percentage of combustion oxygen is offset by the combination of the elevated fuel flow rate and the decreased heat dissipation through less N$_2$ dilution in the oxidant. Thus, even though the O$_2$ concentration in the oxidant increases for increased reducing strength, as a percentage of oxygen required to completely consume the fuel, the oxygen level decreases. In the present embodiment, percent CO content is about ½ of the percent of H$_2$ content at the desired operating temperature, and hence the combustibles content of the reducing gas is approximately 1.5 times the percent of H$_2$ content in the reducing gas. While described in the present application with respect to a fuel cell system, it will be understood that reducing gas generator 14 is equally applicable to other systems, such as systems for generating reducing gas for other purposes.

Referring again to FIG. 3C, at block B128, the reducing gas is supplied to reformer 26, and to anode 20, e.g., via reformer 26.

At block B130, a transition of fuel cell 12 into power production mode is initiated, which includes supplying to fuel cell 12 flows of the primary fuel and the primary oxidant that are normally provided to fuel cell 12 for operation in power production mode, in contrast to the oxidant and hydrocarbon fuel provided to reducing gas generator 14 to generate reducing gas for use during startup or shutdown of fuel cell 12. The transition into power production mode also includes heating portions of fuel cell 12, including anode 20 and reformer 26, to normal operating temperature in a controlled fashion so as to reduce mechanical stresses that might result from thermal gradients within and between such components. The heating of fuel cell 12 may be performed prior to, during and after the provision of reducing gas to fuel cell 12, and may be performed until satisfactory operating temperatures in such portions, e.g., anode 20 and reformer 26, are achieved. During the transition into power production mode, bypass system 98 may be transitioned into bypass mode.

At block B132, fuel cell 12 is operated in power production mode, i.e., normal operating mode, to supply power to electrical load 16.

At block B134, the airflow and fuel flow supplied to reducing gas generator 14 are terminated, ending the production of reducing gas by reducing gas generator 14.

Figure 3D:
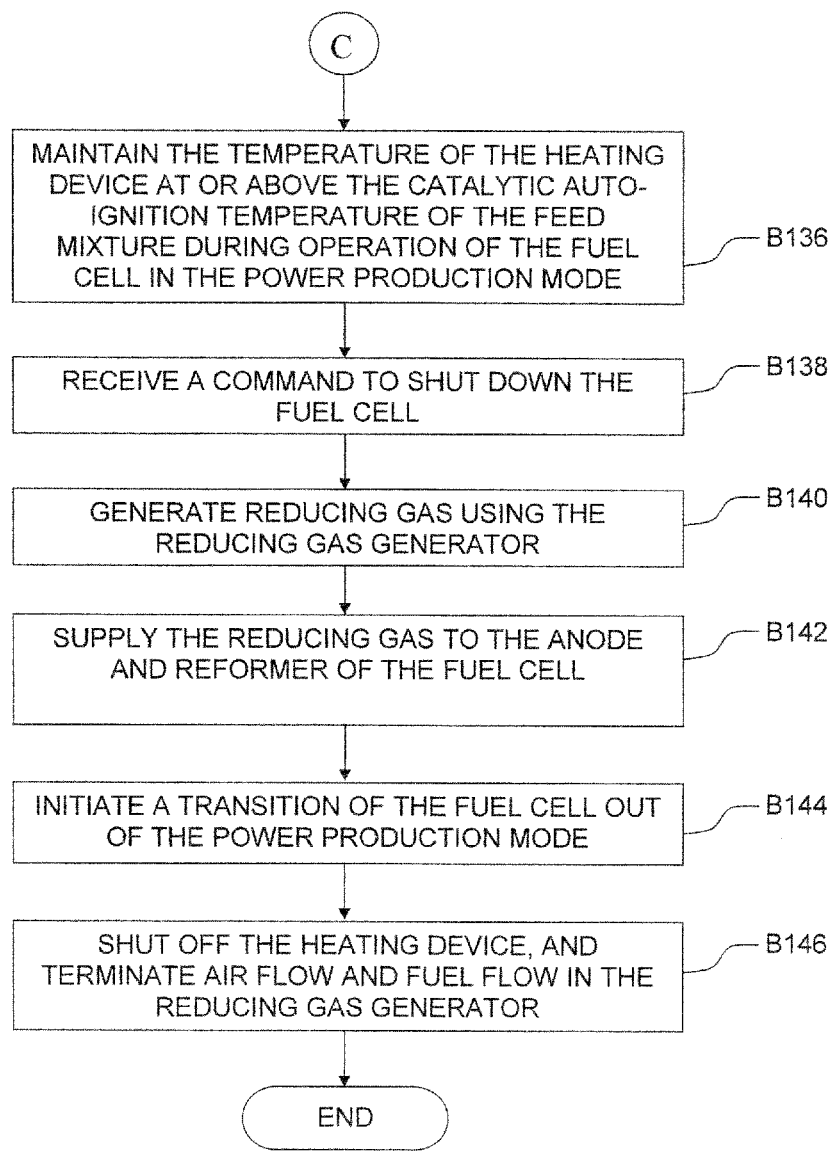

Referring now to FIG. 3D, at block B136, the temperature of the heating device is maintained at or above the temperature required to initiate catalytic reaction of the feed mixture at catalyst 36. This temperature is maintained during operation of the fuel cell in the power production mode, e.g., in order to provide for rapid restart of reducing gas generator 14, including rapid restart of catalyst 36, in the event of a need to shut down fuel cell 12.

At block B138, a command to shut down fuel cell 12 from the power production mode is received by control system 96, e.g., via a human input or an automated process. It will be noted that in some embodiments, block B136 may be performed subsequent to receiving the command to shut down fuel cell 12. For example, in some embodiments, the heating device may be not be heated to a temperature at or above the catalytic light-off temperature until the command to shut-down fuel cell 12 is received.

At block B140, reducing gas generator 14 generates reducing gas in response to the command, e.g., by performing some or all of the actions indicated above with respect to blocks B102 to B128, including controlling the O$_2$ content of the oxidant stream and the oxidant/fuel ratio of the feed mixture to selectively vary the reducing strength of the reducing gas by selectively varying the combustibles content of the reducing gas to a desired level while maintaining a selected temperature, e.g., the selected temperature of block B122, above.

At block B142, the reducing gas generated by reducing gas generator 14 is supplied to anode 20 of fuel cell 12 by disengaging bypass system 98 from the bypass mode. This may help to prevent oxidation damage to anode 20 during shutdown of fuel cell 12. Initially, the reducing gas may have a high reducing strength, which may be decreased as the temperature of fuel cell 12 decreases.

At block B144, a transition of fuel cell 12 out of the power production mode is initiated, including gradually reducing the flow to anode 20 of the primary fuel that is normally provided during operation in power production mode.

At block B146, the airflow and fuel flow supplied to reducing gas generator 14 are terminated, ending the production of reducing gas by reducing gas generator 14. Block B146 may be executed after anode 20 is sufficiently cooled to a temperature at which oxidative damage is not a concern, which may vary with the materials used to manufacture anode 20.

A reducing gas generator in accordance with some embodiments of the present application may include a compressed air supply that feeds a polymer nitrogen-separation membrane, which uses the high pressure to segregate oxygen from nitrogen across a polymer fiber. Such embodiments may preclude the need for bottled nitrogen. In other embodiments, other nitrogen sources may be employed. The product gas is a nitrogen-rich stream that is depleted in oxygen. A variable-position bypass valve may divert a relatively small stream of the feed air around the nitrogen generator for blending with the nitrogen-rich stream. In some embodiments, the bypass airflow is directly proportional to the final oxygen content of the blended streams. The blended stream of nitrogen-rich product gas and bypass air may be referred to as an oxidant stream, which passes through a flow control device that sets the flow of oxidant to the process. The bypass valve controls the proportions of bypass air and nitrogen-rich gas to achieve the desired oxygen content of the oxidant stream.

A relatively small quantity of hydrocarbon fuel may be metered into the oxidant stream through a flow control device. In a steady state flow mode, the premixed oxidant and fuel blend is fed directly into a catalytic reactor that converts the feed mixture into the reducing gas. Compared with ordinary combustion in air, the reduced oxygen content oxidant stream may translate to less fuel per unit combustibles yield in the reducing gas. Thus, the required chemical energy input (i.e., the thermal load due to the input of fuel) per unit production of combustibles (e.g., H$_2$ and CO) may also be decreased, and therefore, less heat may need to be extracted from the process gas to cool the product stream to a required temperature. The nitrogen dilution of the oxidant stream may also decrease the reaction temperature into the range that may be preferable for the catalyst, and may not exceed the material limits in the downstream heat exchanger. In contrast to embodiments of the present invention, a reactor designed for combustion with normal air (in contrast to the nitrogen-rich oxidant employed in embodiments of the present invention) at the required scale might be complex, and might require cooling jackets that would likely require a liquid coolant, or otherwise a very high volumetric flow of coolant gas, and therefore, would have a relatively large heat duty in order to protect reactor materials from excessive temperature. In contrast, the catalytic reactor of some embodiments of the present invention may be designed to operate at a lower temperature without the need for external cooling.

Fuel oxidation with an oxygen-depleted oxidant may yield a given range of combustibles concentration (or molar flow) over a much wider range of air to fuel ratio relative to ordinary combustion with air, which makes control of the combustibles content easier to achieve.

Thermocouple(s) may monitor the exit temperature at the catalyst exit. The thermocouple may act as the control input for the air bypass valve. If the exit temperature were to fall too far below the set point, a control signal would open the bypass by some amount since an oxidant stream having a higher proportion of $O_2$ elevates the exit temperature (by oxidizing more fuel) and vice versa. The set point temperature is set high enough to achieve complete conversion of the flammable feed mixture to the equilibrated gas composition, but not too high as to approach the operational material limit temperatures for either the catalyst or the downstream heat exchanger.

An oxygen sensor 66 may measure the oxygen content on a volume basis of the oxidant stream downstream of the mix point for the bypass air and the nitrogen-rich stream exiting the nitrogen generator. An alternative embodiment may employ the measured oxygen concentration rather than the exit temperature to position air bypass control valve so that the exit temperature is maintained to a set point value. This may be preferable at start-up before a representative steady state reactor exit temperature is available to set the bypass valve position.

The oxygen sensor may be a small zirconia sensor maintained at a high temperature, e.g., around 600° C. for some embodiments, which develops a Nernst potential when exposed to oxygen, which is related to the oxygen content of the gas. The sensor can be located in-situ. However, the sensor may alternatively be submerged in a controlled small slip stream that is blown down off the main process line through a critical flow orifice. The control software may dictate the relationship between the deviation of the measured oxygen content from the targeted value, and the incremental amount the bypass valve is opened as a result. The sensor may have a rapid response to changes in the oxygen content of the process gas, and therefore, the optimized tuning parameters on the air bypass valve control loop may provide more reliable control over a broader range of conditions.

The downstream heat exchanger cools the reducing gas to a temperature that is required for introduction of the reducing gas into the downstream process. A temperature control loop may vary a flow of cooling air or other cooling medium to the heat exchanger based on the deviation of the catalyst exit temperature from the temperature set point of the outlet gas. The heat exchanger may be a compact alloy steel or ceramic design to withstand the temperature of the gas exiting the catalyst.

A hydrogen or combustibles sensor may extract a slipstream of the process gas downstream of the heat exchanger to measure the percent by volume hydrogen or combustibles as a constituent of the reducing gas. The control software may compare the measured % $H_2$ to a set point value, and based on the difference sends a control signal to fuel control valve. If the measured % $H_2$ deviates too far below the set point, the fuel feed would be increased, and vice versa. The control software may dictate the relationship between the deviation of the measured % $H_2$ with the targeted % $H_2$, and the incremental amount the fuel valve is opened or closed.

One approach for continuously measuring hydrogen uses a thermal conductivity hydrogen sensor calibrated over the permissible range of hydrogen content for the reducing gas. Similar to the oxygen sensor, a critical flow orifice may be used as a relatively inexpensive and simple way to meter a very small slipstream of the reducing gas at the correct sample gas flow to the sensor.

A method for rapid restart of the catalyst from a standby condition to bring the reducing gas generator back on-line as quickly as possible for unforeseen events within the fuel cell system that will require an immediate supply of safe reducing gas may also be provided by embodiments of the present invention. A rapid restart capability may avoid the need for a bottled storage of reducing-gas necessary to bridge the gap between the time that the gas is demanded and the time required to bring the reducing gas generator on-line. A rapid restart method may employ a heater with a high thermal mass located just upstream of the catalyst reactor and, e.g., a pair of valves or a three-way valve for diverting feed mixture flow through the heater. During normal operation the valve directs the mixture directly into the catalytic reactor, bypassing the heater. At start-up, flow may be diverted through the heater. In the absence of flow, e.g., under idle conditions of the reducing gas generator, the heater is continuously supplied sufficient power to sustain the metal at the desired preheat temperature while balancing a relatively small heat loss, and thus, this power demand may be small. Within the heater, a flow coil may be engulfed with a metallic body. The heater may contain sufficient thermal mass so that when flow is initiated upon a re-start attempt, the process stream immediately acquires the targeted ignition temperature.

Such a design may be relatively safe because it may achieve good electrical isolation between the flammable mixture and the power supply that acts on the metallic body. Prior to a re-start sequence, the heater regulates power to the internal metal to the required temperature prior to the introduction of flow, and must only maintain power to offset heat loss through the surrounding insulation at this condition.

On a start-up attempt, power may be immediately ramped up to sustain or elevate the set-point preheat temperature until reaction of the catalyst feed mixture is achieved. Once this is achieved, e.g., as indicated by a sufficient rise in temperature at the catalyst exit, the flow may be diverted around the ignition heater directly into the catalyst (normal operating flow mode) to prevent overheating of the catalyst.

To further promote rapid re-start, band heaters may provide an additional heat source. The band heaters may surround the catalyst reactor to hold the catalyst at or above the catalyst light-off temperature before flow is initiated at start-up. Prior to start-up, the band heaters would preferably provide the energy to offset heat loss through the insulation surrounding the band heaters. Once the catalyst is lit, the band heaters may turn off as the skin temperature rises above the set point temperature of the heaters. Power to the heater may be either turned off or turned down to sustain the heater's thermal mass at the temperature set point for the next restart.

Other alternative embodiments would simplify the heat-up scheme by employing a closely coupled heater at the catalyst inlet. This approach may use a low thermal mass heater that would locally initiate reaction near the front side of the catalyst by close thermal coupling, which in such embodiments may potentially reduce the reducing gas generator's part count and cost.

In an additional embodiment, the reducing gas generator may replace the internal reformer for the fuel cell system for those embodiments where the reducing gas generator is structured to produce a reducing gas that is suitable for power production in the fuel cell system. In some such embodiments, the reduced gas generator may be used for producing a reducing gas of one composition for startup and shutdown of the fuel cell system, and for producing a reducing gas of an alternate composition for the normal operation of the fuel cell system.

Figure 5A:
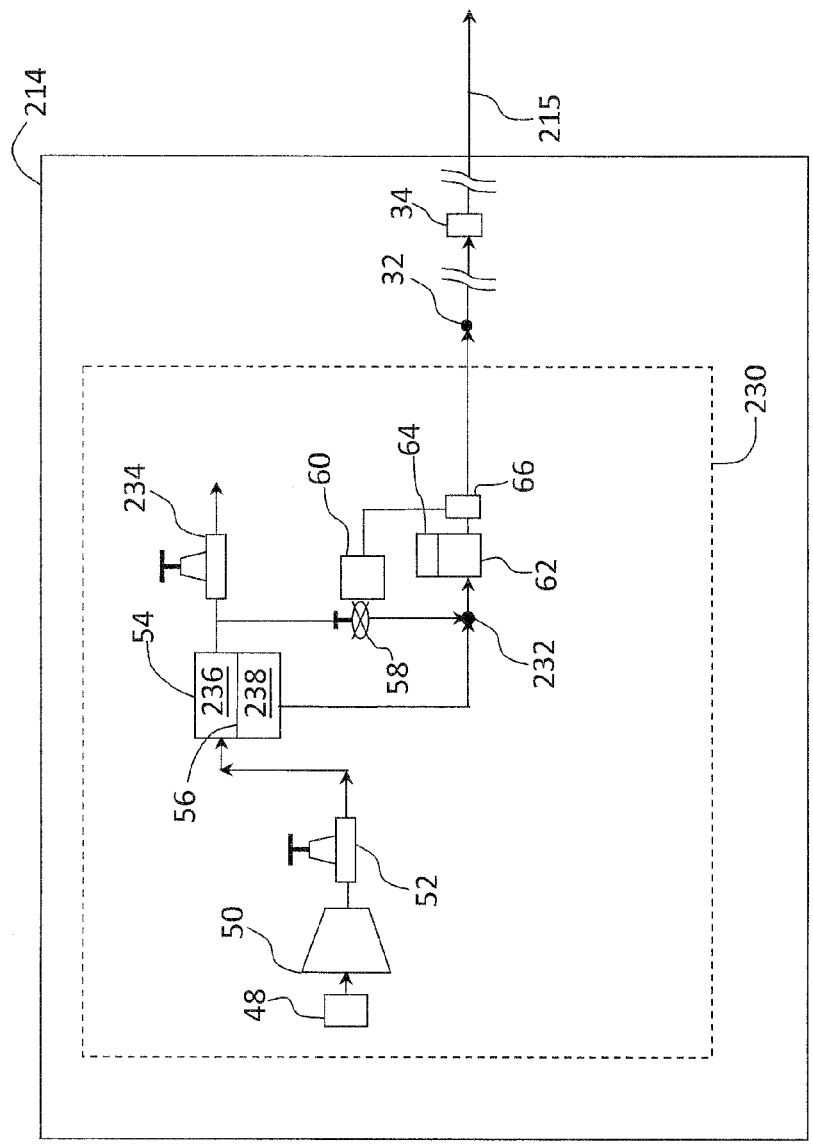
FIGS. 5A and 5B schematically illustrates some aspects of non-limiting examples of an oxidant system in accordance with embodiments of the present invention.
Figure 5B:
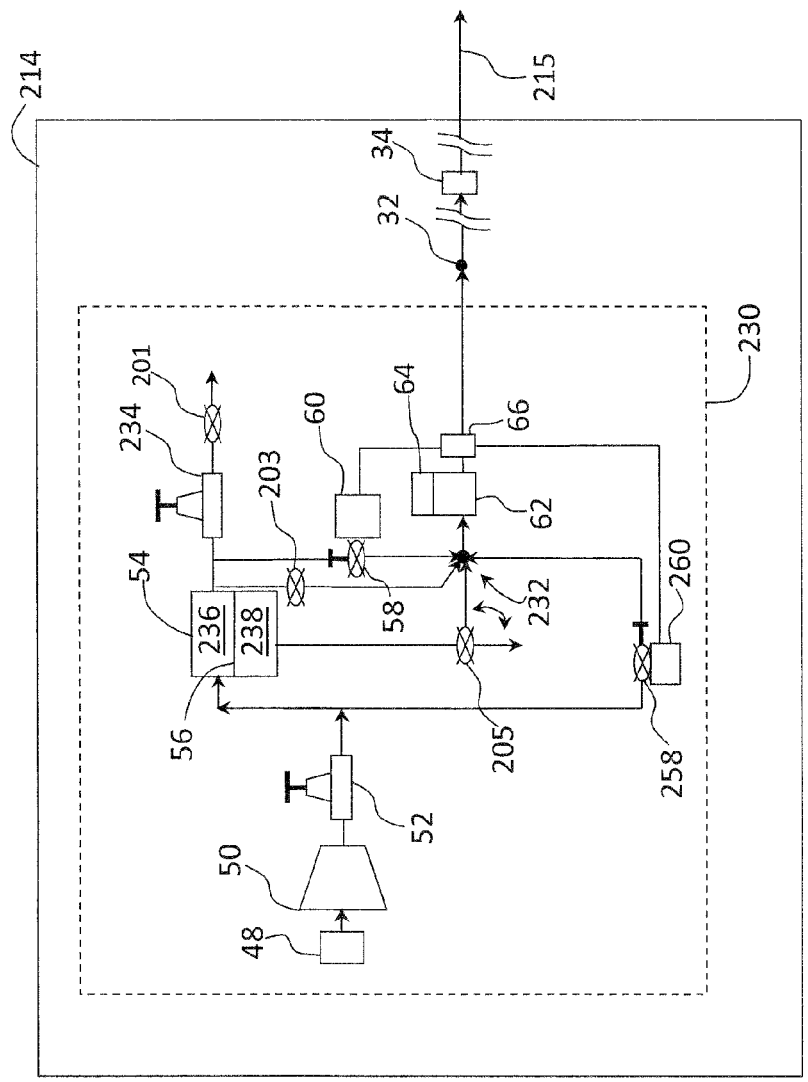

Referring to FIGS. 5A and 5B, some aspects of non-limiting examples of a reducing gas generator 214 in accordance with embodiments of the present invention are schematically depicted. In the embodiments depicted in FIGS. 5A and 5B, various features, components and interrelationships therebetween of aspects of embodiments of the present invention are depicted. However, the present invention is not limited to the particular embodiments of FIGS. 5A and 5B and the components, features and interrelationships therebetween as are illustrated in FIGS. 5A and 5B and described herein. For example, other embodiments encompassed by the present invention, the present invention being manifested by the principles explicitly and implicitly described herein via the present Figures and Detailed Description and set forth in the Claims, may include a greater or lesser number of components, features and/or interrelationships therebetween, and/or may employ different components and/or features having the same and/or different nature and/or interrelationships therebetween, which may be employed for performing similar and/or different functions relative to those illustrated in FIGS. 5A and 5B and described herein.

In some reducing gas generator embodiments, it is desirable to increase the flammables content (concentration) of the reducing gas, which may also be referred to as a reformed fuel, than that afforded by some previously described embodiments. The flammables (also referred to as combustibles) content in the reformed gas varies with the oxygen ($O_2$) content (concentration) present in the oxidant supplied with the hydrocarbon fuel to the reformer. For example, some previously described embodiments employed air control valve 58 to variably add air to the nitrogen-rich gas received from nitrogen generator 54 to yield an oxidant having a variable oxygen content ranging from, for example and without limitation, 5% to approximately 21% by volume. In such embodiments, the flammables content of the reformed gas discharged by catalytic reactor 34, which is a reducing gas, varies with the amount of oxygen provided in the oxidant. The inventor has determined that an oxygen-enriched oxidant having a greater oxygen content than air may be employed to yield a higher flammability content in the reformed gas exiting catalytic reactor 34 than that achieved by using air or nitrogen-enriched air having a lower oxygen content than air as the oxidant.

Accordingly, in some embodiments, 214 reducing gas generator includes an oxidant system 230 configured to provide an oxidant with an oxygen content greater than that of ambient atmospheric air. In one form, oxidant system is configured to provide the oxidant without the use of stored oxygen, e.g., bottled oxygen or other forms of compressed or liquefied oxygen. Reducing gas generator 214 is configured to provide or discharge a reducing gas 215 having an expanded range of flammables content relative to the reducing gas provided by reducing gas generator 14, based on using the oxidant discharged by oxidant system 230. Reducing gas 215 may be supplied, in various embodiments, to other systems, such as piston engines, gas turbine engines, fuel cell systems and/or other systems that employ reducing gas. In some embodiments, oxidant system 230 is configured to provide an oxidant with the oxygen content at a selected value in a range having a maximum value that exceeds the oxygen content of air, e.g., in the range of approximately 21% to 40% oxygen by volume in some embodiments, and approximately 21% to 50% oxygen by volume or greater in other embodiments. In some embodiments, oxidant system 230 is configured to provide a variable oxygen content in the oxidant in a range having a maximum value that exceeds the oxygen content of air, e.g., in the range of approximately 21% to 40% oxygen by volume in some embodiments, and approximately 21% to 50% oxygen by volume or greater in other embodiments. In some embodiments, oxidant system 230 is configured to vary the oxygen content in a range extending from below the oxygen content of ambient atmospheric air to an oxygen content above that of ambient atmospheric air e.g., in the range of approximately 5% to 40% oxygen by volume in some embodiments, and approximately 5% to 50% oxygen by volume or greater in other embodiments or lesser in still other embodiments. In some embodiments, oxidant system 230 is used in place of oxidant system 30 in reducing gas generator 14 to yield a reducing gas generator 214 configured to discharge a reducing gas having a higher flammables content than reducing gas generator 14. Oxidant system 230 has many of the same components described above with respect to oxidant system 30, which perform the same or similar functions as those described above with respect to oxidant system 30 and reducing gas generator 14.

In one form, reducing gas generator 214 employs the same components to perform the same or a similar function as that described above with respect to reducing gas generator 14, most of which are not illustrated in FIG. 5 for purposes of clarity, except that oxidant system 30 is replaced with an oxidant system 230. In other embodiments, reducing gas generator 214 may include only one or more of the components described above with respect to reducing gas generator 14 and/or may include components not described above with respect to reducing gas generator 14. In some embodiments, any of the same components as described above with respect to gas generator 14 may provide the same and/or a different function in reducing gas generator 214.

Although the component identified with element number 34 has been referred to as a "catalytic reactor," it will be understood by those having ordinary skill in the art that catalytic reactor 34 is one form of a reformer. Hence, catalytic reactor 34 may also be referred to as "reformer 34." It will also be understood by those having ordinary skill in the art that one or more other reformer types may be employed in addition to or in place of a catalytic reactor in some embodiments of the present invention.

In one form, oxidant system 230 includes an air intake 48 (which in various may or may not be pressurized, e.g., may or may not be provided with pressurized air); a compressor 50; a valve 52, e.g., a pressure regulator; a nitrogen generator or separator 54 having a nitrogen separation membrane 56, a valve 58, for example and without limitation, a gas flow control valve; a merge chamber 232; a controller 60, for example and without limitation, a gas flow controller; a valve 62, for example and without limitation, an oxidant flow control valve; a controller 64, for example and without limitation, an oxidant flow controller; and an oxygen sensor 66. The output of oxidant system 230 is discharged to merge chamber 32. In one form, each of merge chamber 32, air intake 48, compressor 50, valve 52, nitrogen generator or separator 54 with nitrogen separation membrane 56, controller 60, valve 62, controller 64 and oxygen sensor 66 are each same or similar and configured to perform the same or similar function as set forth above with respect to oxidant system 30 and reducing gas generator 14, and hence are described using the same reference characters (element numbers). In other embodiments, oxidant system 230 may include only one or more of the components described above with respect to oxidant system 30 and/or one or more of such components may perform a different function; and/or oxidant system 230 may include components not described above with respect to oxidant system 30. For example, in some embodiments, valves 52 and 62, and controller 64 may be replaced by a flow sensor that controls the speed of compressor 50. It will be understood that in some embodiments, other types of nitrogen extraction systems may be employed in addition to or in place of nitrogen separation membrane 56. Oxidant system 230 also includes a valve 234, for example and without limitation, a back-pressure regulating valve, although other valve types may be employed in other embodiments of the present invention.

Compressor 50 is in fluid communication with air intake 48. Valve 52 is in fluid communication with compressor 50 and nitrogen separator 54 on the high pressure side 236 of nitrogen separation membrane 56 (as in reducing gas generator 14), and is configured to control the air flow delivered to nitrogen separator 54. Nitrogen separation membrane 56 configured to extract nitrogen from the air supplied thereto, and to discharge the balance of the air supplied as an oxygen-rich gas having a greater oxygen content than ambient atmospheric air, wherein the oxygen-rich gas forms at least a part of the oxidant discharged by oxidant system 230. Hence, nitrogen generator 54 is also configured extract oxygen from air in the form of an oxygen-rich gas, and to discharge an oxygen-rich gas with the extracted oxygen to form at least a part of the oxidant. Nitrogen generator 54 is also configured to discharge a nitrogen-rich gas, the nitrogen-rich gas having a nitrogen content greater than that of ambient atmospheric air, e.g., in terms of percentage by volume.

Valve 58 is coupled to a merge chamber 232, which has structural attributes similar to those described above with respect to merge chamber 32. Merging chamber 232 is also in fluid communication with nitrogen separator 54 on the low pressure side 238 of nitrogen separation membrane 56, which provides an oxygen-rich gas, e.g., oxygen-enriched air.

Merging chamber 32 is configured to receive the hydrocarbon fuel and the oxidant discharged from oxidant system 230, and to discharge a feed stream containing both the hydrocarbon fuel and the oxidant. Controller 60 is operably coupled to valve 58 and configured to operate valve 58. Valve 62 is in fluid communication with merge chamber 32 and configured to discharge an oxidant (stream) to merge chamber 32. Controller 64 is operably coupled to valve 62 and configured to operate valve 62. Oxygen sensor 66 is configured to sense the oxygen content of the oxidant discharged from valve 62.

Valve 234 is in fluid communication with nitrogen separator 54 on the high pressure side 236, and with valve 58. Excess nitrogen-rich gas is vented, e.g., to atmosphere or a component or system requiring nitrogen rich gas. Valve 234 is determines much excess nitrogen-rich gas is vented from oxidant system 230. In one form, valve 234 regulates back pressure against the high pressure side 236 of nitrogen separator 54, and against valve 58. In one form, the amount of excess nitrogen-rich gas that is vented increases with increasing oxygen content in the oxidant discharged by oxidant system 230. The back-pressure maintained by valve 234 determines, at least in part, how much oxygen-rich gas is discharged by low pressure side 238 of nitrogen separator 54.

Valve 58 is configured to control the amount of nitrogen-rich gas from nitrogen separator 54 that is supplied to merge chamber 232. In one form, the output of low pressure side 236 of nitrogen separator 54 is supplied directly to merging chamber 232 for combining the oxygen-rich gas from low pressure side 236 of nitrogen separator 54 with the nitrogen-rich gas supplied by high pressure side 236 of nitrogen separator 54 to yield an oxidant (stream). Valve 62 and controller 64 are configured to control how much oxidant is supplied to merge chamber 32 for combining with a gaseous hydrocarbon fuel, such as natural gas or compressed natural gas (CNG), for use in reformer 34. Reformer 34 is in fluid communication with merging chamber 32, and is configured to receive the feed stream from merging chamber 32, to reform the feed mixture into a reducing gas, and to discharge the reducing gas.

Low pressure side 238 of nitrogen separator 54 is configured to discharge the oxygen-rich gas with an oxygen content greater than ambient atmospheric, for example and without limitation, up to 40% oxygen content by volume in some embodiments, and up to 50% or more oxygen content by volume in other embodiments. By mixing the oxygen-rich gas with nitrogen rich gas, the resultant oxygen content of the oxidant discharged by oxidant system 230 may be reduced, e.g., from a maximum value. Hence, the oxidant discharged by oxidant system 230 of oxidant system may have a maximum value for oxygen content greater than that of air, up to 40% oxygen content by volume in some embodiments, and up to 50% or more oxygen content by volume in other embodiments.

In some embodiments, a lower oxygen content may also be obtained, e.g., down to 5% or less oxygen by volume. Referring to FIG. 5B, in some embodiments, as set forth above, oxidant system 230 may be configured to provide an oxidant having an oxygen content less than that of ambient atmospheric air, e.g., to 5% or less, for example, by including some additional aspects of oxidant system 30. For example, in some embodiments, oxidant system 230 may also include a second instance of valve 58 and controller 60, referred to herein as valve 258 and controller 260, in fluid communication between the discharge of valve 52 and merging chamber 232. Controller 260 is coupled to oxygen sensor 66, and is configured to operate valve 260 to control a flow of pressurized air from compressor 50 and valve 52 to merging chamber 232. In addition, such embodiments of oxidant system 230 may include a valve 201, for example and without limitation, a shutoff valve; a valve 203, for example and without limitation, a bypass valve; and a valve 205, for example and without limitation, a three-way valve. In order to output an oxidant having an oxygen content approximately 21% or less by volume, valve 201 is closed to prevent the venting of nitrogen-rich gas from high pressure side 236 of nitrogen separator 54. In addition, valve 203 is opened, and valve 58 is closed, thereby shunting the output of high pressure side 236 of nitrogen separator 54 (nitrogen-rich gas) directly to merging chamber 232. Also, valve 205 is switched vent the output of low pressure side 238 of nitrogen separator 54, e.g., to atmosphere or an application that employs an oxygen-rich gas. In order to output an oxidant having an oxygen content approximately 21% or greater by volume, valve 201 is opened to allow the venting of nitrogen-rich gas from high pressure side 236 of nitrogen separator 54 via a valve 234. In addition, valve 203 is closed, and valve 58 is opened, thereby directing the output of high pressure side 236 of nitrogen separator 54 (other than that which is vented) through valve 58 to merging chamber 232. Also, valve 205 is switched supply the output of low pressure side 238 of nitrogen separator 54 to merging chamber 232.

In some embodiments, one or more of compressor 50, and valves 52, 234, 58 and 62 may be adjusted or controlled, manually or automatically, to provide an oxidant having an oxygen content selectable from, for example and without limitation, the range of approximately 21% to 40% oxygen by volume in some embodiments, and approximately 21% to 50% oxygen by volume or greater in other embodiments. In some embodiments, one or more of compressor 50, and valves 52, 234, 58 and 62, as well as valves, 201, 203, 205, 258 and 260 may be adjusted or controlled, manually or automatically, to provide an oxidant having an oxygen content selectable from the range of, for example and without limitation, the range of approximately 5% to 40% oxygen by volume in some embodiments, and approximately 5% to 50% oxygen by volume or greater in other embodiments. In other embodiments, one or more of compressor 50, and valves 52, 234, 58 and 62, and in some embodiments, one or more of valves, 201, 203, 205, 258 and 260 as well, may be adjusted or controlled, manually or automatically to provide a variable oxygen content in the oxidant supplied by oxidant system 230, i.e., that varies within a range, "on the fly," e.g., to meet some demand, such as a desired flammables content of the reducing gas discharged by reducing gas generator 214. In various embodiments, the range may be, for example and without limitation, approximately 21% to 40% oxygen by volume in some embodiments, and approximately 21% to 50% oxygen by volume or greater in other embodiments, or may be from approximately 5% to 40% oxygen by volume in some embodiments, and approximately 5% to 50% oxygen by volume or greater in other embodiments. In other embodiments, other suitable ranges may be selected.

The reducing gas exiting reformer 34 includes flammables, including primarily hydrogen ($H_2$) and carbon monoxide (CO), and some methane slip, e.g., on the order of approximately 1%, and trace amounts of higher hydrocarbon slip, such as ethane. The reducing gas also includes also contains other gases, e.g., including nitrogen, carbon dioxide ($CO_2$) and water vapor (steam).

Figure 6:
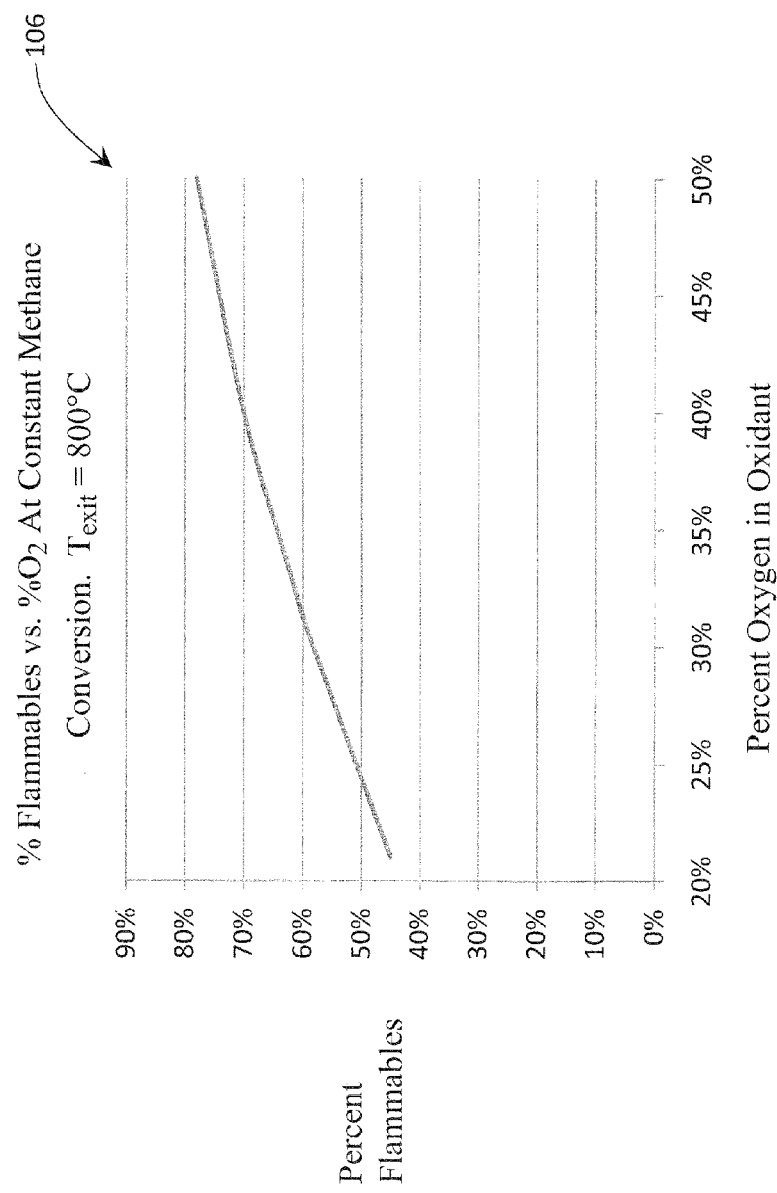
FIG. 6 illustrates the flammables content in a reformed gas plotted against oxygen percentage at constant methane conversion.

Referring to FIG. 6, a non-limiting example of a plot 106 of percent flammables output by a reformer, such as reformer 34, vs. percent oxygen in the oxidant supplied to the reformer, at constant methane conversion, i.e., at a constant percentage of methane in the reducing gas discharged by reformer 34, is depicted. The plot of FIG. 6 is based on thermodynamic equilibrium process simulation calculations. From the plot of FIG. 6, it is seen that the flammables content (percent flammables) of the reducing gas increases with increasing oxygen in the oxidant supplied to as part of the feed stream provided to reformer 34. The oxygen/carbon ratio in the plot of FIG. 6 is varies between approximately 0.6 (e.g., at 50% oxygen by volume) to 0.7 (e.g., at 21% oxygen by volume). The flammables content of FIG. 6 varies from approximately 45% by volume at approximately 21% oxygen content by volume in the oxidant to approximately 80% by volume at 50% oxygen content by volume in the oxidant.

By providing an oxidant having a greater oxygen content than that of ambient atmospheric air, the amount of flammables in the reducing gas discharged by reformer 34 may be greater than that capable of being generated using an oxygen content equivalent to that of air. In addition, by varying the oxygen content, e.g., in one or more of the ranges set forth above, the flammables content of the reducing gas 215 discharged by reducing gas generator may be varied over a substantial range. For example and without limitation, in some embodiments, approximately 45% to 70% flammables content by volume, in other embodiments, approximately 45% to 80% flammables content by volume; in yet other embodiments, approximately near 0% to 70% flammables content by volume; and in still other embodiments, in yet other embodiments, approximately near 0% to 80% flammables content by volume.

In some embodiments, the reducing gas is generated by generating an oxidant with oxidant system 230 having an oxygen content greater than that of ambient atmospheric air, forming a feed stream with the oxidant and a hydrocarbon fuel; and reforming the feed stream, e.g., in reformer 34, e.g., by directing the feed stream to catalyst 36; and catalytically converting the feed stream into a reducing gas. In some embodiments, the oxygen content of the oxidant may be varied or selected within a range, e.g., as set forth above. In one form, the generating of the oxidant includes supplying pressurized air to nitrogen separation membrane 56; extracting an oxygen-rich gas using nitrogen separation membrane 56; and forming the oxidant at least in part using the oxygen-rich gas. In some embodiments, the oxidant may be provided having a selectable oxygen content in the range of approximately 21% to 40% 21% to 40% oxygen by volume, and approximately 21% to 50% oxygen by volume or greater in other embodiments. In some embodiments, the oxidant may be provided having a selectable oxygen content in the range of approximately 5% to 40% oxygen by volume in some embodiments, and approximately 5% to 50% oxygen by volume or greater in other embodiments.

In some embodiments, the reducing gas may be generated by using oxidant system 230 to generate an oxidant having a selectable oxygen content, wherein a maximum oxygen content of the oxidant exceeds that of ambient atmospheric air; using reformer 34 to reform a hydrocarbon fuel with the oxidant to produce reducing gas 215; and discharging reducing gas 215 from reformer 34. In some embodiments, the oxidant may also be generated to have an oxygen content less than that of ambient atmospheric air.

Embodiments of the present invention include a reducing gas generator, comprising: an oxidant system configured to generate from air an oxidant having a variable oxygen content, and configured to provide an oxygen content of the oxidant at a selected value in a range from the oxygen content of ambient atmospheric air to greater than that of ambient atmospheric air; a merging chamber in fluid communication with the oxidant system and a source of a hydrocarbon fuel, wherein the merging chamber is configured to receive the hydrocarbon fuel and the oxidant and to discharge a feed stream containing both the hydrocarbon fuel and the oxidant; and a reformer in fluid communication with the merging chamber, wherein the reformer is configured to receive the feed stream from the merging chamber, to reform the feed stream into a reducing gas, and to discharge the reducing gas.

In a refinement, the oxidant system includes a nitrogen separator having a nitrogen separation membrane configured to extract nitrogen from air supplied thereto, and to discharge the balance of the air supplied as an oxygen-rich gas, wherein the oxygen-rich gas forms at least a part of the oxidant.

In another refinement, the oxygen-rich gas has a higher oxygen content than ambient atmospheric air.

In yet another refinement, the oxygen-rich gas has an oxygen content in the range of approximately 21% to 50% by volume.

In still another refinement, the nitrogen separator is also configured to discharge a nitrogen-rich gas, the nitrogen-rich gas having a nitrogen content greater than that of ambient atmospheric air.

In yet still another refinement, the reducing gas generator further comprises at least one valve configured to combine the nitrogen-rich gas with the oxygen-rich gas to form the oxidant.

In a further refinement, the reducing gas generator is configured to generate a reducing gas having a flammables content in the range of approximately 0% to 80% by volume.

In a yet further refinement, the reformer is a catalytic reactor.

In a still further refinement, the reducing gas generator is configured to generate a reducing gas having a flammables content in the range of approximately 0% to 80% by volume.

Embodiments of the present invention include a reducing gas generator, comprising: an oxidant system configured to provide an oxidant, and configured to provide an oxygen content of the oxidant having a value that exceeds the oxygen content of ambient atmospheric air, wherein the oxidant system is configured to provide the oxidant without the use of stored oxygen; and a reformer configured to receive the oxidant from the oxidant source, to receive a hydrocarbon fuel, to reform the oxidant and fuel into a reducing gas, and to discharge the reducing gas.

In a refinement, the oxidant system is configured generate the oxidant from ambient atmospheric air.

In another refinement, the oxidant system is configured to provide a variable oxygen content in the oxidant in a range having a maximum value that exceeds the oxygen content of air.

In yet another refinement, the oxidant system is configured to provide a selectable oxygen content of the oxidant in a range of approximately 21% to 50% by volume.

In still another refinement, the oxidant system is configured to provide a selectable oxygen content in the oxidant in a range of approximately 5% to 50% by volume.

In yet still another refinement, the oxidant system includes a nitrogen generator having a nitrogen separation membrane operable to extract nitrogen from air, and wherein the nitrogen generator is configured to discharge the balance of the air supplied thereto as an oxygen-rich gas, wherein the oxygen-rich gas forms at least a part of the oxidant.

In a further refinement, the nitrogen generator is also configured to discharge a nitrogen-rich gas, the nitrogen-rich gas having a nitrogen content greater than that of ambient atmospheric air.

In a yet further refinement, the reducing gas generator further comprises at least one valve configured to mix the nitrogen-rich gas with the oxygen-rich gas to form the oxidant.

Embodiments of the present invention include a method of generating a reducing gas, comprising: generating an oxidant having an oxygen content greater than that of ambient atmospheric air without the use of stored oxygen; forming a feed stream with the oxidant and a hydrocarbon fuel; and reforming the feed stream.

In a refinement, the method further comprises varying the oxygen content of the oxidant.

In another refinement, the reforming of the feed stream includes directing the feed stream to a catalyst; and catalytically converting the feed stream into a reducing gas.

In yet another refinement, the generating of the oxidant includes supplying pressurized air to a nitrogen separation membrane; extracting an oxygen-rich gas using the nitrogen separation membrane; and forming the oxidant at least in part of the oxygen-rich gas.

In still another refinement, the generating of the oxidant includes providing a selectable oxygen content of the oxidant in a range of approximately 21% to 50% oxygen by volume.

In yet still another refinement, the generating of the oxidant includes generating the oxidant with the oxygen content of the oxidant being in a range of approximately 5% to 50% oxygen by volume.

Embodiments of the present invention include a method of generating a reducing gas, comprising: generating an oxidant having a selectable oxygen content, wherein a maximum oxygen content of the oxidant exceeds that of ambient atmospheric air, wherein the generating is performed without the use of stored oxygen; reforming a hydrocarbon fuel with the oxidant to produce a reducing gas; and discharging the reducing gas from a reformer.

In a refinement, the generating of the oxidant includes generating the oxidant with an oxygen content being less than that of ambient atmospheric air.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A reducing gas generator, comprising:
an oxidant system configured to generate from air an oxidant having a variable oxygen content, and configured to provide an oxygen content of the oxidant at a selected value greater than that of ambient atmospheric air;
the oxidant system including a first merging chamber configured to receive an oxygen-rich gas and a nitrogen-rich gas, and a valve controlling an amount of the nitrogen-rich gas received in the first merging chamber for mixing with the oxygen-rich gas, such that the oxidant is discharged from the first merging chamber with the oxygen content at the selected value;
a second merging chamber in fluid communication with the oxidant system and a source of a hydrocarbon fuel, wherein the second merging chamber is configured to receive the hydrocarbon fuel and the oxidant and to discharge a feed stream containing both the hydrocarbon fuel and the oxidant; and
a reformer in fluid communication with the second merging chamber and including a catalytic reactor, wherein the reformer is configured to receive the feed stream from the second merging chamber, to reform the feed stream into a reducing gas, and to discharge the reducing gas;
a temperature sensor positioned downstream of an inlet to the reformer so as to measure at least one of a temperature of catalyst in the catalytic reactor and a temperature of reducing gas output by the catalytic reactor; and
a control system in communication with the temperature sensor, the control system being programmed to control a flow rate of the feed stream, and to control both they oxygen content for the oxidant, via controlling the valve responsive to signals from the temperature sensor, and an oxidant/fuel ratio of the feed stream to maintain a predetermined control temperature while achieving a desired flammables content of the reducing gas output by the reducing gas generator;

wherein the desired flammables content is in the range of approximately 45% to 80% by volume.

2. The reducing gas generator of claim 1, wherein the oxidant system includes a nitrogen separator having a nitrogen separation membrane configured to extract nitrogen from air supplied thereto, and to discharge the balance of the air supplied as an oxygen-rich gas to the first merging chamber.

3. The reducing gas generator of claim 2, wherein the oxygen-rich gas has an oxygen content in the range of approximately 21% to 50% by volume.

4. The reducing gas generator of claim 2, wherein the nitrogen separator is also configured to discharge a nitrogen-rich gas, the nitrogen-rich gas having a nitrogen content greater than that of ambient atmospheric air.

5. The reducing gas generator of claim 4, further comprising at least one valve configured to combine the nitrogen-rich gas with the oxygen-rich gas to form the oxidant.

6. The reducing gas generator of claim 1, wherein the reformer is a catalytic reactor.

7. A reducing gas generator, comprising:
an oxidant system configured to provide an oxidant, and configured to provide an oxygen content of the oxidant having a value that exceeds the oxygen content of ambient atmospheric air, wherein the oxidant system is configured to provide the oxidant without the use of stored oxygen;
the oxidant system further including a first merging chamber configured to receive an oxygen-rich gas and a nitrogen-rich gas, and a valve controlling an amount of the nitrogen-rich gas nitrogen-rich gas received in the first merging chamber for mixing with the oxygen-rich gas, such that the oxidant is provided from the first merging chamber with the oxygen content at the selected value;
a second merging chamber in fluid communication with the first merging chamber and a source of a hydrocarbon fuel, so as to discharge a feed stream containing both the hydrocarbon fuel and the oxidant;
a reformer including a catalytic reactor, and being configured to receive the feed stream, to reform the oxidant and fuel into a reducing gas, and to discharge the reducing gas;
a temperature sensor positioned downstream an inlet to the reformer so as to measure at least one of a temperature of catalyst in the catalytic reactor and a temperature of reducing gas output by the catalytic reactor; and
a control system in communication with temperature sensor, the control system being programmed to control a flow rate of the feed stream, and to control both the oxygen content of the oxidant, via controlling the valve responsive to signals from the temperature sensor, and an oxidant/fuel ratio of the feed stream to maintain a predetermined control temperature while achieving a desired flammables content of the reducing gas output by the reducing gas generator;
wherein the desired flammables content is in the range of approximately 45% to 80% by volume.

8. The reducing gas generator of claim 7, wherein the oxidant system is configured to generate the oxidant from ambient atmospheric air.

9. The reducing gas generator of claim 7, wherein the oxidant system is configured to provide a variable oxygen content in the oxidant in a range having a maximum value that exceeds the oxygen content of air.

10. The reducing gas generator of claim 7, wherein the oxidant system is configured to provide a selectable oxygen content of the oxidant in a range of approximately 21% to 50% by volume.

11. The reducing gas generator of claim 7, wherein the oxidant system is configured to provide a selectable oxygen content in the oxidant in a range of approximately 5% to 50% by volume.

12. The reducing gas generator of claim 7, wherein the oxidant system includes a nitrogen generator having a nitrogen separation membrane operable to extract nitrogen from air, and wherein the nitrogen generator is configured to discharge the balance of the air supplied thereto as the oxygen-rich gas.

13. The reducing gas generator of claim 12, wherein the nitrogen generator is also configured to discharge a nitrogen-rich gas, the nitrogen-rich gas having a nitrogen content greater than that of ambient atmospheric air.

* * * * *